(12) United States Patent
Naito et al.

(10) Patent No.: US 7,782,537 B2
(45) Date of Patent: *Aug. 24, 2010

(54) OPTICAL ARTICLE AND PROCESS FOR PRODUCING OPTICAL ARTICLE

(75) Inventors: Shuji Naito, Naganoken (JP); Yosuke Sugihara, Naganoken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/247,073

(22) Filed: Oct. 7, 2008

(65) Prior Publication Data

US 2009/0097129 A1    Apr. 16, 2009

(30) Foreign Application Priority Data

| Oct. 15, 2007 | (JP) | ............................ 2007-267774 |
| Jan. 28, 2008 | (JP) | ............................ 2008-016342 |
| Aug. 12, 2008 | (JP) | ............................ 2008-208121 |

(51) Int. Cl.
  G02B 1/04    (2006.01)
  G02B 5/00    (2006.01)

(52) U.S. Cl. ...................................... 359/642; 359/652

(58) Field of Classification Search ......... 359/642–801; 428/323

See application file for complete search history.

(56) References Cited

U.S. PATENT DOCUMENTS 5,472,797 A    12/1995    Yajima et al.

| 2005/0041298 A1 | 2/2005 | Toda et al. |
| 2006/0251884 A1 | 11/2006 | Naito et al. |
| 2009/0040457 A1 | 2/2009 | Nakajima et al. |
| 2009/0191391 A1* | 7/2009 | Naito et al. ................. 428/216 |

FOREIGN PATENT DOCUMENTS

| EP | 0578220 A2 | 7/1993 |
| EP | 1566666 A1 | 8/2005 |
| EP | 1726974 A2 | 11/2006 |
| JP | 06-082604 | 3/1994 |
| JP | 08-094801 | 4/1996 |
| JP | 2004-002712 | 1/2004 |
| JP | 2005-281527 | 10/2005 |
| JP | 2007-102096 | 4/2007 |
| WO | 2007018108 A2 | 2/2007 |
| WO | 2007043301 A1 | 4/2007 |

OTHER PUBLICATIONS

European Search Report for corresponding European application 08018006.0-1524 lists the references above.

* cited by examiner

Primary Examiner—Darryl J Collins
(74) Attorney, Agent, or Firm—Hogan Lovells US LLP (57) ABSTRACT

An optical article includes a plastic substrate, wherein a primer layer and a hard coat layer are formed on a surface of the plastic substrate, and the primer layer is formed from a coating composition containing the following components (A) to (C): (A) a polyurethane resin; (B) metal oxide fine particles; and (C) an organosilicon compound.

11 Claims, 1 Drawing Sheet

FIG. 1

OPTICAL ARTICLE AND PROCESS FOR PRODUCING OPTICAL ARTICLE

BACKGROUND

1. Technical Field

The present invention relates to an optical article to be used as a plastic lens for spectacles, cameras, and the like, and a process for producing an optical article.

2. Related Art

Plastic lenses are lightweight and excellent in moldability, processability, dyeability, etc. and less likely to crack and have high safety as compared with glass lenses. Therefore, their use has rapidly spread in the field of lenses for spectacles and they make up a large portion thereof. Further, recently, in order to meet an additional demand of reducing the thickness and weight, a material having a high refractive index such as a thiourethane resin or an episulfide resin has been developed. For example, a process for producing an episulfide resin having a very high refractive index by polymerization of a compound having an epithio group (an episulfide compound) in the presence of sulfur has been proposed (see JP-A-2004-002712 and JP-A-2005-281527). Such an episulfide resin can easily exhibit a high refractive index of 1.7 or higher and is effective in reducing the thickness of lenses for spectacles.

On the other hand, when the refractive index of a lens substrate is increased, a primer layer and a hard coat layer should have a refractive index equal to that of the lens substrate for preventing the occurrence of interference fringe. For example, in general, any of various metal oxides is incorporated in the hard coat layer as a filler thereby increasing the refractive index. As the metal oxide, fine particles of a simple substance such as titanium oxide, zirconium oxide, antimony oxide or tin oxide or composite fine particles thereof are used. However, such a metal oxide is generally poor in light resistance and tends to be colored. Therefore, from the viewpoint of transparency and stability in the visible light range and the like, titanium oxide is mainly used. However, titanium oxide has a property of exhibiting a photocatalytic action under ultraviolet radiation. Therefore, when titanium oxide is used as a filler in the hard coat layer, it decomposes a binder component composed of an organic resin therearound, and the coat layer is often peeled off. As one of the measures for this problem, it is often the case that not anatase-type titanium oxide which is likely to exhibit a photocatalytic action, but rutile-type titanium oxide which exhibits a relatively less photocatalytic action is adopted as titanium oxide (for example, see JP-A-2007-102096).

However, such rutile-type titanium oxide do not completely have a photocatalytic action, and an attempt that the photocatalytic action is reduced by coating the surface thereof with an insulating material such as silicon dioxide has also been made, but is not sufficient. Accordingly, when light resistance is considered, a method of increasing the content of rutile-type titanium oxide in the coating layer could not simply increase the refractive index of a hard coat layer or a primer layer, and when a lens substrate has a refractive index of 1.7 or higher, the occurrence of interference fringe could not completely be prevented. Further, a problem has also arisen that the impact resistance is decreased as the thickness of a lens substrate is reduced.

SUMMARY

An advantage of some aspects of the invention is to provide an optical article which includes a plastic substrate, a primer layer, and a hard coat layer, causes almost no interference fringe, and is excellent in impact resistance, and a process for producing an optical article.

A first aspect of the invention is directed to an optical article composed of a plastic substrate, wherein a primer layer and a hard coat layer are formed on a surface of the plastic substrate, and the primer layer is formed from a coating composition containing the following components (A) to (C):

(A) a polyurethane resin;
(B) metal oxide fine particles; and
(C) an organosilicon compound.

In accordance with the aspect of the invention, as the coating composition for forming the primer layer, not only a polyurethane resin and metal oxide fine particles are used, but also an organosilicon compound is used in combination. Therefore, a space portion in the primer layer is filled with the organosilicon compound (component (C)), and thus the density of the entire primer layer is increased. Accordingly, even without using titanium oxide, or by incorporating only a small amount of titanium oxide therein, the refractive index of the primer layer can be improved, and the occurrence of interference fringe can be prevented. Further, when the used amount of titanium oxide is decreased, the photocatalytic action is also decreased, and the light resistance is improved. Further, a polyurethane resin is contained in the primer layer, therefore the impact resistance is also superior.

As the plastic substrate, a plastic substrate which is obtained by polymerizing and curing a polymerizable composition containing an episulfide compound as a main component, and has a refractive index of 1.7 or higher is preferred. Because the plastic substrate has a high refractive index of 1.7 or higher, the reduction of the thickness of the substrate for an optical article is easy, and further, an optical article having few interference fringes can be easily provided.

It is preferred that the average particle diameters of the component (A) and the component (B) in the coating composition are from 5 to 50 nm, respectively, and the average particle diameter of the component (C) is 5 nm.

In accordance with this configuration, the average particle diameters of the component (A) and the component (B), and the average particle diameter of the component (C) each fall within a predetermined range, and therefore, the refractive index of the primer layer can be further improved. As a result, even when a plastic substrate having a high refractive index of 1.7 or higher is used, the occurrence of interference fringe can be effectively prevented.

The mechanism of this action is presumed as follows. In the absence of the component (C), even when the refractive index of metal oxide fine particles as the component (B) is increased or the ratio thereof is increased, the refractive index of the primer layer is not improved so much. Therefore, as the mechanism of action for achieving the above-mentioned effect, because the average particle diameters of the above-mentioned respective particles fall within a predetermined range, the component (C) enters a space (a space portion) formed by the particles composed of the component (A) and the particles composed of the component (B), resulting in forming a dense layer at such a portion and contributing to the improvement of refractive index. The average particle diameters of the above-mentioned respective particles can be obtained by a light scattering method.

It is preferred that the optical article according to the aspect of the invention has a first layer which is in contact with the plastic substrate and has a refractive index which decreases in the direction away from the plastic substrate; a second layer which is in contact with the first layer and has a refractive index not higher than that of the surface layer of the first layer;

and a hard coat layer which is in contact with the second layer and has a refractive index lower than that of the plastic substrate.

In accordance with this configuration, the optical article basically includes a plastic substrate, a hard coat layer, and first and second layers, both of which are sandwiched between the plastic substrate and the hard coat layer. Therefore, the first and second layers can be allowed to serve as a primer layer, that is, a function including adhesion and impact resistance. Further, by allowing the first layer having a refractive index which decreases in the direction away from the plastic substrate to have a function to prevent the occurrence of interference fringe through adjustment of the refractive index, the need of increasing the refractive index of the second layer can be relieved. Due to this, in the second layer, the need of increasing the ratio of metal oxide fine particles can be relieved, therefore, the second layer can sufficiently exhibit an impact absorbing function. Further, because the need of increasing the refractive index of the second layer can be relieved, the need of increasing the refractive index of the hard coat layer can also be relieved.

That is, in this optical article, by the first layer, adhesion and a function to prevent the occurrence of interference fringe through adjustment of the refractive index can mainly be imparted. By the second layer, impact resistance, that is, impact absorbing function can be mainly imparted. Further, by providing a hard coat layer which is harder than the first and second layers on the second layer, scratch resistance and abrasion resistance can be imparted. Further, because the need of increasing the refractive index of the second layer and also the need of increasing the refractive index of the hard coat layer can be relieved by the first layer, the refractive indices of the second layer and the hard coat layer to be laminated to the first layer can be lower than that of the plastic substrate. Accordingly, the constitutions of these layers, choices of compositions for forming these layers and the degree of freedom of the designing are increased. As described above, according to the aspect of the invention, the occurrence of interference fringe can be prevented, and an optical article which has high durability including impact resistance, scratch resistance, and abrasion resistance and also has a high refractive index can be provided.

It is preferred that the second layer is formed from a second material containing a urethane, ester, epoxy, acrylic or silicone organic resin and metal oxide fine particles.

In accordance with this configuration, the second layer is formed from the second material containing a urethane, ester, epoxy, acrylic, or silicone organic resin and metal oxide fine particles. Therefore, adhesion becomes more favorable. Further, among these organic resins, a urethane or ester organic resin is preferred. The second layer can be formed by, for example, a dip coating method, a spin coating method, a spray coating method or the like.

It is preferred that a first material for forming the first layer, the second material for forming the second layer and a third material for forming the hard coat layer each contain metal oxide fine particles and an organic resin, and the ratio of the metal oxide fine particles to the organic resin contained in the first material is greater than the ratio of the metal oxide fine particles to the organic resin contained in the second material.

In accordance with this configuration, the first layer having a high refractive index in the vicinity of the plastic substrate can be obtained and also the second layer having high impact resistance can be obtained. Further, in this case, the ratio of the metal oxide fine particles to the organic resin contained in the third material may be set greater than the ratio of the metal oxide fine particles to the organic resin contained in the second material.

It is preferred that the refractive index of the primer layer decreases continuously or stepwise from the side of the plastic substrate toward the side of the hard coat layer.

In accordance with this configuration, the refractive index of the primer layer decreases continuously or stepwise from the side of the plastic substrate toward the side of the hard coat layer, therefore, the refractive index of the hard coat layer can be decreased. That is, even when the refractive index of the hard coat layer is low, a difference in the refractive index with the primer layer can be made small, therefore, the occurrence of interference fringe can be prevented.

In the past, in the case where a hard coat layer was formed on a surface of an optical article such as an optical lens, when the refractive index of a substrate was high, it was necessary that the a primer layer and the hard coat layer should have a high refractive index in response thereto. In accordance with the aspect of the invention, the refractive index of the hard coat layer should not be increased, and therefore, the degree of freedom of designing of the hard coat layer is increased.

It is preferred that a difference between the refractive index of the primer layer in the vicinity of the plastic substrate and the refractive index of the plastic substrate is 0.01 or less.

In accordance with this configuration, a difference between the refractive index of the primer layer in the vicinity of the plastic substrate and the refractive index of the plastic substrate is a predetermined value or less, therefore, the occurrence of interference fringe can be effectively prevented.

It is preferred that a difference between the refractive index of the primer layer in the vicinity of the hard coat layer and the refractive index of the hard coat layer is 0.01 or less.

In accordance with this configuration, a difference between the refractive index of the primer layer in the vicinity of the hard coat layer and the refractive index of the hard coat layer is a predetermined value or less, therefore, the occurrence of interference fringe can be effectively prevented.

It is preferred that the component (C) is an organosilicon compound having an epoxy group.

In accordance with this configuration, the organosilicon compound has an epoxy group, therefore, the adhesion of the primer layer to the plastic substrate and the hard coat layer is excellent. Further, the crosslink density of the primer layer is not increased too much and is appropriately controlled, therefore, the optical article is excellent in impact resistance.

It is preferred that the component (C) is an organoalkoxysilane compound and the organoalkoxysilane compound is used in the form of an unhydrolyzed monomer.

In accordance with this configuration, the organoalkoxysilane compound is used in the form of an unhydrolyzed monomer, therefore, it is easily filled in a space portion in the primer layer as compared with the case where it is polymerized by hydrolysis. Accordingly, the refractive index of the primer layer is further improved, and the occurrence of interference fringe can be prevented although an episulfide plastic substrate having a refractive index of 1.7 or higher is used.

It is preferred that the ratio of the component (C) to the total components (A) to (C) is from 0.1 to 10% by mass.

In accordance with this configuration, the ratio of the organosilicon compound as the component (C) is 0.1% by mass or more, therefore, the adhesion to the plastic substrate and the hard coat layer is superior. In addition, because the ratio of the organosilicon compound is 10% by mass or less, a decrease in the refractive index and abrasion resistance is not caused. The upper limit of the component (C) is preferably 7% by mass or less; and more preferably 5% by mass or less.

It is preferred that the component (B) is metal oxide fine particles surface-treated with an organosilicon compound having an alkyl group.

In accordance with this configuration, by using a polyurethane resin and metal oxide fine particles surface-treated with an organosilicon compound having an alkyl group such as a methyl group, the compatibility between the resin component and the metal oxide fine particle component is improved in the primer layer, and as a result, the homogeneity is improved. Therefore, the occurrence of interference fringe is prevented and the impact resistance is also improved. Further, when the homogeneity of the primer layer is improved, the homogeneity of spaces to be filled with an organosilicon compound as the component (C) is also improved at the same time, and as a result, the refractive index of the primer layer is further improved and the occurrence of interference fringe can be more effectively prevented.

It is preferred that the component (B) is metal oxide fine particles containing titanium oxide having a rutile-type crystal structure as a main component.

In accordance with this configuration, metal oxide fine particles containing titanium oxide having a rutile-type crystal structure as a main component are used as the component (B), therefore, not only the refractive index of the primer layer is improved, but also the light resistance is improved. In particular, a polyurethane resin to be used as the component (A) greatly contributes to the improvement of light resistance.

It is preferred that the ratio of the component (B) to the total components (A) to (C) is from 40 to 80% by mass.

In accordance with this configuration, the ratio of the metal oxide particles as the component (B) to the total components (A) to (C) falls within a predetermined range of from 40 to 80% by mass, therefore, the refractive index of the primer layer can be sufficiently increased, and also the crosslink density of the primer layer can be appropriately maintained, and further, the hardness and impact resistance are not impaired.

It is preferred that the optical article according to an aspect of the invention is a plastic lens.

In accordance with this configuration, a substrate having a refractive index of 1.7 or higher, i.e., having a high refractive index is used, and moreover, a primer layer is formed from the above-mentioned components (A) to (C), therefore, a plastic lens which is very thin and is excellent in impact resistance and causes almost no interference fringe can be provided. Accordingly, the plastic lens according to the aspect of the invention can be widely used as a variety of thin-type optical lenses such as lenses for spectacles, lenses for cameras, lenses for telescopes, lenses for microscopes and collective lenses for steppers.

A second aspect of the invention is directed to a process for producing an optical article composed of a plastic substrate includes a substrate production step of producing a plastic substrate by polymerizing and curing a polymerizable composition; and a surface treatment step of forming a primer layer and a hard coat layer on a surface of the plastic substrate, wherein in the formation of the primer layer in the surface treatment step, a coating composition containing the following components (A) to (C) is used:

(A) a polyurethane resin;
(B) metal oxide fine particles; and
(C) an organosilicon compound.

In accordance with the aspect of the invention, a plastic substrate is produced by polymerizing and curing a polymerizable composition, therefore, a substrate having a different refractive index can be easily obtained. For example, when a polymerizable composition containing an episulfide compound as a main component is used, a substrate having a high refractive index of 1.7 or higher can be easily obtained. Further, because the production process includes a surface treatment step of forming a given primer layer and hard coat layer, an optical article which has few interference fringes and is excellent in scratch resistance and impact resistance can easily be produced.

BRIEF DESCRIPTION OF THE DRAWING

The invention will be described with reference to the accompanying drawing, wherein like numbers reference like elements.

The FIG. 1 is a view schematically showing a plastic lens as an optical article according to a second embodiment of the present invention.

DESCRIPTION OF EXEMPLARY EMBODIMENTS

Hereinafter, embodiments of an optical article and a process for producing an optical article of the present invention will be described in detail.

First Embodiment

An optical article of this embodiment is a plastic lens for spectacles and has a plastic lens substrate (hereinafter also referred to as merely a "lens substrate"), a primer layer formed on a surface of the lens substrate and a hard coat layer formed on the upper surface of the primer layer. Further, in the plastic lens of this embodiment, further an antireflection layer is formed on the upper surface of the hard coat layer. Hereinafter, the lens substrate, primer layer, hard coat layer and antireflection layer will be described.

1. Lens Substrate

The lens substrate is not particularly limited as long as it is a plastic resin, however, in light of reduction of the thickness of a lens for spectacles or for obtaining a difference in the refractive index with the antireflection layer formed on the upper layer of the surface of the lens substrate, a plastic resin having a refractive index of preferably 1.65 or higher, more preferably 1.7 or higher, further more preferably 1.74 or higher, most preferably 1.76 or higher is used.

Examples of such a lens material having a refractive index of 1.65 or higher include a polythiourethane plastic produced by reacting a compound having an isocyanate group or an isothiocyanate group with a compound having a mercapto group and an episulfide plastic produced by polymerizing and curing a raw material monomer including a compound having an episulfide group.

As the compound having an isocyanate group or an isothiocyanate group to be a main component of a polythiourethane plastic, a known compound can be used. Specific examples of the compound having an isocyanate group include ethylene diisocyanate, trimethylene diisocyanate, 2,4,4-trimethylhexane diisocyanate, hexamethylene diisocyanate, and m-xylylene diisocyanate.

As the compound having a mercapto group, a known compound can be used, and examples thereof include an aliphatic polythiols such as 1,2-ethanedithiol, 1,6-hexanedithiol, and 1,1-cyclohexanedithiol; and aromatic polythiols such as 1,2-dimercapto benzene and 1,2,3-tris(mercaptomethyl)benzene. In order to increase the refractive index of a plastic lens, a polythiol containing a sulfur atom in addition to a mercapto group is more preferably used, and specific examples thereof include 1,2-bis(mercaptomethylthio)benzene, 1,2,3-tris (mercaptoethylthio)benzene, and 1,2-bis((2-mercaptoethyl) thio)-3-mercaptopropane.

Further, a plastic resin obtained by polymerizing and curing a polymerizable composition containing an episulfide compound as a main component to have a refractive index of 1.7 or higher, preferably higher than 1.7 is also preferably used.

As the episulfide compound, a known compound having an episulfide group can be used without any limitation. Specific examples thereof include an episulfide compound obtained by substituting a part or all of oxygen of the epoxy group of an existing epoxy compound with sulfur. Further, in order to increase the refractive index of a lens substrate, a compound containing a sulfur atom in addition to an episulfide group is preferably used, and specific examples thereof include 1,2-bis(β-epithiopropylthio)ethane, bis(β-epithiopropyl)sulfide, 1,4-bis(β-epithiopropylthiomethyl)benzene, 2,5-bis(β-epithiopropylthiomethyl)-1,4-dithiane, and bis(β-epithiopropyl)disulfide. These episulfide compounds may be used alone or in admixture thereof.

The lens substrate can be obtained by mixing the above-mentioned episulfide compound as a monomer and a given catalyst and optionally sulfur, casting the resulting mixture into a glass or metal mold and effecting so-called cast-molding polymerization. By performing polymerization in the presence of sulfur, a lens substrate having a high refractive index of 1.74 or higher is easily obtained. When sulfur is mixed, the amount of sulfur is preferably from 0.1 to 25 parts by mass, more preferably from 1 to 20 parts by mass based on 100 parts by mass of the episulfide compound.

Examples of the catalyst to be used in the polymerization include amines, phosphines, quaternary ammonium salts, quaternary phosphonium salts, tertiary sulfonium salts, secondary iodonium salts, mineral acids, Lewis acids, organic acids, silicic acids, and tetrafluoroboric acids.

Among these, preferred examples of the catalyst include amines such as aminoethanol and 1-aminopropanol, quaternary ammonium salts such as tetrabutyl ammonium bromide, and quaternary phosphonium salts such as tetramethyl phosphonium chloride and tetramethyl phosphonium bromide.

Further, the catalyst to be used should be selected according to the type of monomer to be used, and also the addition amount thereof should be adjusted, however, in general, the addition amount thereof is preferably from 0.001 to 0.1% by mass based on the total amount of the lens substrate raw material.

The polymerization temperature is preferably from about 5 to 120° C., and the reaction time is from about 1 to 72 hours. After completion of the polymerization, in order to remove lens substrate strain, an annealing treatment at 50 to 150° C. for about 10 minutes to 5 hours is preferably performed.

When the above-mentioned polymerizable composition is prepared, it is also preferred that a polyisocyanate compound and/or a polythiol compound are/is further mixed as another monomer.

By allowing not only an episulfide compound, but also a polyisocyanate compound or a polythiol compound to participate in polymerization, a lens substrate having more excellent dyeability and heat resistance can be obtained.

Further, in the polymerizable composition, any of various known additives such as an ultraviolet absorber, an infrared absorber, a light stabilizer, an internal mold release agent, an antioxidant, a dye, a photochromic dye, a pigment, and an antistatic agent can be blended as needed.

2. Primer Layer

The primer layer is formed on the outermost surface of the lens substrate and is present at the interface between the lens substrate and the hard coat layer, which will be mentioned later, and basically has a property of exhibiting adhesion to both lens substrate and hard coat layer and impact resistance.

The primer layer according to the invention is formed from a coating composition containing the following components (A) to (C):
 (A) a polyurethane resin;
 (B) metal oxide fine particles; and
 (C) an organosilicon compound.

The polyurethane resin as the component (A) exhibits adhesion to both lens substrate and hard coat layer. Further, the polyurethane resin has a superior effect of improving light resistance as compared with the case where another resin such as a polyester resin is used.

The polyurethane resin is not particularly limited, and a water-soluble or water-dispersible polyurethane resin obtained by reacting a diisocyanate compound with a diol compound can be used. Further, one type or two or more types of polyurethane resins can be used. Examples of the diisocyanate compound include alicyclic diisocyanate compounds such as hexamethylene diisocyanate, 2,2,4-trimethylhexamethylene diisocyanate, hydrogenerated xylylene diisocyanate, 1,4-cyclohexane diisocyanate and 4,4-dicyclohexylmethane diisocyanate; aromatic aliphatic diisocyanate compounds such as xylylene diisocyanate and tetramethylxylylene diisocyanate; aromatic diisocyanate compounds such as toluene diisocyanate and phenylmethane diisocyanate; and modified compounds of these diisocyanates (such as carbodiimide-, uretodione-, and uretoimine-containing modified compounds).

Examples of the diol compound include diol compounds obtained by (co)polymerization of an alkylene oxide such as ethylene oxide or propylene oxide or a heterocyclic ether such as tetrahydrofuran. Specific examples of the diol compound include polyether diols such as polyethylene glycol, polypropylene glycol, polytetramethylene ether glycol, and polyhexamethylene ether glycol; polyester diols such as polyethylene adipate, polybutylene adipate, polyneopentyl adipate, poly-3-methylpentyl adipate, polyethylene/butylene adipate, and polyneopentyl/hexyl adipate; polylactone diols such as polycaprolactone diol; and polycarbonate diols. Among these, one or more diol compounds selected from polyether diols, polyester diols and polycarbonate diols are preferred.

Preferred examples of the polyurethane resin include polyether polyurethane resins, polyester polyurethane resins, and polycarbonate polyurethane resins obtained by using a polyether diol, a polyester diol, or a polycarbonate diol as a diol compound. The form of the polyurethane resin is also not particularly limited. Typically, an emulsion type, for example, a self-emulsified emulsion and a self-stabilized emulsion can be exemplified. In particular, among the above-mentioned compounds, preferred is a polyurethane resin in which a diol having an acidic group such as a carboxylic acid group or a sulfonic acid group is used, or a polyhydroxy compound having a low molecular weight is added, or an acidic group is introduced, and particularly preferred is a polyurethane resin having a carboxyl group. Further, from the viewpoint of improvement of gloss, scratch resistance and the like, it is preferred that a functional group such as a carboxyl group is crosslinked through a crosslinking treatment.

The polyurethane resin as the component (A) is present in the coating composition as fine particles, and the average particle diameter of the polyurethane resin is preferably from 5 to 50 nm, and more preferably from 20 to 30 nm. When the average particle diameter of the polyurethane resin is less than 10 nm or exceeds 50 nm, a synergistic effect with the component (B) or the component (C), which will be mentioned later, cannot be exhibited, and it becomes difficult to effectively improve the refractive index of the primer layer. The particle diameter of the polyurethane resin can be controlled by the production condition or molecular weight of the polyurethane resin, the stirring speed for the coating composition or the like.

The average particle diameter of the polyurethane resin as fine particles is measured by a light scattering method. For example, by using a dynamic light scattering particle size distribution analyzer (manufactured by Horiba Seisakusho K.K., trade name: LB-550), the particle diameter distribution and average particle diameter can be measured.

The blending amount of the polyurethane resin is preferably from 20 to 60% by mass and more preferably from 30 to 50% by mass based on the total amount of the components (A) to (C) in the coating composition.

When the blending amount of the polyurethane resin is less than 20% by mass, the impact resistance or light resistance of a final product in the case where a spectacle lens is formed as the final product may be insufficient. Further, when the blending amount of the polyurethane resin exceeds 60% by mass, the refractive index of the primer layer is decreased, and an interference fringe is liable to be caused, and the appearance of the resulting spectacle lens may be deteriorated.

Preferred specific examples of the polyurethane resin include NeoRez R-960 (manufactured by Zeneca), Hydran AP-30 (manufactured by Dainippon Ink & Chemicals, Inc.), Superflex 210 (manufactured by Dai-ichi Kogyo Seiyaku Co., Ltd.), Izelax S-1020 (manufactured by Hodogaya Chemical Co., Ltd.), Neotan UE-5000 (manufactured by Toagosei Co., Ltd.), RU-40 series (manufactured by Stal Japan), WF-41 series (manufactured by Stal Japan), and WPC-101 (manufactured by Japan Urethane Industry).

The metal oxide fine particles as the component (B) not only intend to improve the refractive index of the primer layer, but also contribute to the improvement of water resistance, weather resistance, and light resistance by serving as a filler to increase the crosslink density of the primer layer.

As the metal oxide fine particles, fine particles containing titanium oxide are preferred, and particularly from the viewpoint of light resistance, composite metal oxide fine particles containing titanium oxide having a rutile-type crystal structure are more preferably used. Examples of the composite metal oxide fine particles include fine particles which are composed of titanium oxide and tin oxide, or titanium oxide, tin oxide and silicon oxide, have a rutile-type crystal structure, and have an average particle diameter of from 1 to 200 nm.

By using metal oxide fine particles containing titanium oxide having a rutile-type crystal structure, the weather resistance and light resistance are further improved. Further, the refractive index of a rutile-type crystal is higher than that of an anatase-type crystal, therefore, metal oxide fine particles (composite fine particles) having a relatively high refractive index can be obtained.

Further, the metal oxide fine particles as the component (B) are preferably surface-treated with an organosilicon compound having an alkyl group such as a methyl group. As the organosilicon compound having an alkyl group, among the organosilicon compounds to be used as the component (C), which will be mentioned later, an organosilicon compound having an alkyl group is preferably used.

By using metal oxide fine particles surface-treated with an organosilicon compound having an alkyl group, the compatibility with the polyurethane resin is improved, and as a result, the homogeneity is improved. Therefore, the occurrence of interference fringe is prevented and also the impact resistance of a spectacle lens is improved in the end. Further, when the homogeneity of the primer layer is improved, the homogeneity of spaces to be filled with the organosilicon compound as the component (C) is also improved at the same time, and as a result, the refractive index of the primer layer is further improved and the occurrence of interference fringe can be more effectively prevented.

The type or blending amount of the component (B) is determined according to the intended refractive index, hardness, or the like.

The metal oxide fine particles as the component (B) preferably has an average particle diameter of from 5 to 50 nm, more preferably from 10 to 20 nm. When the average particle diameter is less than 10 nm or exceeds 50 nm, a synergistic effect with the component (A) or the component (C), which will be mentioned later, cannot be exhibited, and it becomes difficult to effectively improve the refractive index of the primer layer. Incidentally, the average particle diameter of the metal oxide fine particles can be measured by the same method as that for the component (A).

As for the blending amount of the component (B), the ratio of the component (B) to the total components (A) to (C) in the coating composition is preferably from 40 to 70% by mass, and more preferably from 50 to 60% by mass. When the blending amount is too small, the refractive index and abrasion resistance of the coating layer may be insufficient in some cases. On the other hand, when the blending amount is too large, the impact resistance maybe decreased, or a crack may be caused in the coating layer. In addition, upon dyeing, the dyeability may be decreased.

The organosilicon compound as the component (C) is filled in a space portion in the primer layer thereby increasing the density of the entire primer layer and contributing to the improvement of the refractive index. As such an organosilicon compound, a compound represented by the following formula (1) can be preferably used.

$$R^1R^2{}_nSiX^1{}_{3-n} \qquad (1)$$

(In the formula, $R^1$ represents an organic group having a polymerizable reactive group; $R^2$ represents a hydrocarbon group having 1 to 6 carbon atoms; $X^1$ represents a hydrolyzable group; and n represents 0 or 1.)

Examples of the organosilicon compound of the formula (1) include vinyltrialkoxysilane, vinyltrichlorosilane, vinyltri(β-methoxy-ethoxy)silane, allyltrialkoxysilane, acryloxypropyltrialkoxysilane, methacryloxypropyltrialkoxysilane, β-(3,4-epoxycyclohexyl)-ethyltrialkoxysilane, mercaptopropyltrialkoxysilane, γ-aminopropyltrialkoxysilane, and γ-glycidoxypropyltrialkoxysilane. These organosilicon compounds may be used in combination of two or more of them. Further, when a tetrafunctional organosilicon compound represented by the general formula $SiX_4$ (X represents an alkoxyl group) such as tetramethoxysilane or tetraethoxysilane is used, a similar effect can be obtained.

Further, it is preferred that as the component (C), an organosilicon compound having an epoxy group such as glycidoxymethyltrimethoxysilane, glycidoxymethyltriethoxysilane, α-glycidoxyethyltrimethoxysilane, α-glycidoxyethyltriethoxysilane, β-glycidoxyethyltriethoxysilane, β-glycidoxypropyltrimethoxysilane, α-glycidoxypropyltrimethoxysilane, α-glycidoxypropyltriethoxysilane, β-glycidoxypropyltriethoxysilane, γ-glycidoxypropyltrimethoxysilane, (3,4-epoxycyclohexyl)methyltrimethoxysilane, γ-glycidoxypropylvinyldiethoxysilane, γ-glycidoxypropylphenyldiethoxysilane, or δ-(3,4-epoxycyclohexyl)butyltriethoxysilane is used from the viewpoint of improving the adhesion to the plastic substrate and the hard coat layer.

The average particle diameter of the component (C) is preferably 5 nm or less, and more preferably 1 nm or less. When the average particle diameter of the component (C) exceeds 5 nm, a synergistic effect with the component (A) or the component (B) cannot be exhibited, and it becomes difficult to effectively improve the refractive index of the primer layer. Incidentally, the average particle diameter of the component (C) can be measured by the same method as that for the component (A) or the component (B).

The ratio of the component (C) to the total components (A) to (C) in the coating composition is preferably from 0.1 to 10% by mass. When the ratio of the organosilicon compound as the component (C) is less than 0.1% by mass, the adhesion to the lens substrate and the hard coat layer is not sufficiently exhibited, and further a space portion cannot be completely filled, and thus, the refractive index may not be improved. On the other hand, when the ratio of the organosilicon compound exceeds 10% by mass, the abrasion resistance is decreased and the organosilicon compound is to be present in an excess amount relative to the space portion, and thus, the refractive index may be decreased.

In applying the above-mentioned coating composition (coating liquid), it is effective to previously treat a surface of the lens substrate through an alkali treatment, an acid treatment, a surfactant treatment, a peeling or polishing treatment with inorganic or organic fine particles, or a plasma treatment for the purpose of improving the adhesion between the lens substrate and the primer layer. Further, as for an applying and curing method of the coating composition, the coating composition is applied using a dipping method, a spin coating method, a spray coating method, a roll coating method, a flow coating method or the like, and the resulting coating is dried by heating at a temperature of from 40 to 200° C. for several hours, whereby a primer layer can be formed.

Further, the primer layer has a thickness in a range of from 0.01 to 50 μm, and particularly preferably from 0.1 to 30 μm. When the primer layer has a too small thickness, the basic performance such as water resistance or impact resistance cannot be exhibited, and on the other hand, when the primer layer has a too large thickness, surface smoothness may be deteriorated, or appearance defects such as optical strain, white turbidity or clouding may be caused in some cases.

When the above-mentioned coating composition is applied to the lens substrate, the refractive index of the surface layer of the primer layer (hereinafter referred to as "surface layer") can be made lower than that of the inner layer of the primer layer (hereinafter referred to as "inner layer"). That is, the refractive index of the primer layer can be decreased continuously or stepwise from the side of the lens substrate toward the side of the hard coat layer, which will be mentioned later.

The "surface layer" as used herein refers to a surface of the primer layer on the opposite side of the substrate, that is, a surface of the primer layer on the side of the hard coat layer. The "inner layer" as used herein refers to the primer layer except the surface layer.

The mechanism of expression of the refractive index gradient in the inner layer as described above is presumed as follows. During drying after applying the coating composition to the lens substrate, the polyurethane resin as the component (A) is cured relatively fast in the surface layer, and thereafter, the metal oxide fine particles as the component (B) are cured together with the component (A) gradually toward the inner layer. Accordingly, a cured film in which the content of the component (A) is relatively large in the surface layer and the content of the component (B) is relatively high in the inner layer is formed.

From the viewpoint of prevention of the occurrence of interference fringe, a difference between the refractive index of the primer layer in the vicinity of the lens substrate and the refractive index of the lens substrate is preferably 0.01 or less, and also a difference between the refractive index of the primer layer in the vicinity of the hard coat layer and the refractive index of the hard coat layer is preferably 0.01 or less.

3. Hard Coat Layer

The hard coat layer is formed by, for example, applying a coating composition containing metal oxide fine particles and an organosilicon compound to the surface of the above-mentioned primer layer. As the metal oxide fine particles and organosilicon compound, the same metal oxide fine particles and organosilicon compound as used for the above-mentioned primer layer can be used.

Here, the organosilicon compound serves as a binder in the hard coat layer. When it is intended to obtain a favorable adhesion, $R^2$ in the above-mentioned formula (1) is preferably an epoxy group, and when it is intended to obtain a favorable scratch resistance, $R^2$ in the above-mentioned formula (1) is preferably a methyl group.

When the coating composition (hard coat liquid) containing metal oxide fine particles and an organosilicon compound is prepared, it is preferred that a sol in which metal oxide fine particles are dispersed is mixed with an organosilicon compound. The blending amount of the metal oxide fine particles is determined according to the hardness, refractive index or the like of the hard coat layer, however, it is from 5 to 80% by mass, particularly preferably from 10 to 60% by mass based on the solid content of the hard coat liquid. When the blending amount is too small, the abrasion resistance or refractive index of the hard coat layer is insufficient, and when the blending amount is too large, a crack may be caused in the hard coat layer. Further, when the hard coat layer is dyed, the dyeability may be decreased in some cases.

Further, it is very useful that the hard coat layer contains a polyfunctional epoxy compound in addition to metal oxide fine particles and an organosilicon compound. The polyfunctional epoxy compound improves the adhesion of the hard coat layer to the primer layer and also is capable of improving the water resistance of the hard coat layer and the impact resistance as a plastic lens. Examples of the polyfunctional epoxy compound include aliphatic epoxy compounds such as 1,6-hexanediol diglycidyl ether and ethylene glycol diglycidyl ether; alicyclic epoxy compounds such as isophoronediol diglycidyl ether and bis-2,2-hydroxycyclohexylpropane diglycidyl ether; and aromatic epoxy compounds such as resorcin diglycidyl ether, bisphenol A diglycidyl ether, and cresol novolac polyglycidyl ether.

Further, a curing catalyst may be added to the hard coat layer. Examples of the curing catalyst include perchloric acids such as perchloric acid, ammonium perchlorate and magnesium perchlorate; acetyl acetonates including Cu(II), Zn(II), Co(II), Ni(II), Be(II), Ce(III), Ta(III), Ti(III), Mn(III), La(III), Cr(III), V(III), Co(III), Fe(III), Al(III), Ce(IV), Zr(IV), V(IV) or the like as the central metal atom; amino acids such as amine and glycine; Lewis acids; and organic acid metal salts.

If necessary, the coating composition for forming the hard coat layer thus obtained can be used by diluting with a solvent. Examples of the solvent include alcohols, esters, ketones, ethers and aromatic solvents. Further, if necessary, a small amount of a metal chelate compound, a surfactant, an antistatic agent, an ultraviolet absorber, an antioxidant, a disperse dye, an oil-soluble dye, a pigment, a photochromic compound, a hindered amine-based or hindered phenol-based light resistance and heat resistance stabilizer or the like can be added to the coating composition for forming the hard coat layer thereby improving the coating property of the coating liquid, curing rate and coating performances after curing.

Further, as for an applying and curing method of the coating composition, the coating composition is applied using a dipping method, a spin coating method, a spray coating method, a roll coating method, or a flow coating method, and the resulting coating is dried by heating at a temperature of from 40 to 200° C. for several hours thereby forming a hard coat layer. Further, the hard coat layer preferably has a thickness in a range of from 0.05 to 30 μm. When the thickness is less than 0.05 μm, the basic performance cannot be exhibited. On the other hand, when the thickness exceeds 30 μm, surface smoothness maybe deteriorated, or optical strain maybe caused in some cases.

4. Antireflection Layer

The antireflection layer is a thin layer formed on the hard coat layer as needed. The antireflection layer can be formed by, for example, alternately laminating a low refractive index layer having a refractive index of from 1.3 to 1.5 to a high refractive index layer having a refractive index of from 1.8 to 2.3. The number of layers is preferably from about 5 or 7.

Examples of an inorganic substance to be used in the respective layers constituting the antireflection layer include $SiO_2$, $SiO$, $ZrO_2$, $TiO_2$, $TiO$, $Ti_2O_3$, $Ti_2O_5$, $Al_2O_3$, $TaO_2$, $Ta_2O_5$, $NbO$, $Nb_2O_3$, $NbO_2$, $Nb_2O_5$, $CeO_2$, $MgO$, $Y_2O_3$, $SnO_2$, $MgF_2$, and $WO_3$. These inorganic substances may be used alone or in combination of two or more of them. For example, a layer of $SiO_2$ may be used as a low refractive index layer, and a layer of $ZrO_2$ may be used as a high refractive index layer.

Examples of the method of forming such an antireflection layer include a vacuum vapor deposition method, an ion plating method, and a sputtering method. In the vacuum vapor deposition method, an ion beam assist method in which an ion beam is simultaneously irradiated during deposition may be employed.

The antireflection layer may also be formed using a wet process. For example, the antireflection layer can also be formed by using a coating composition containing silica fine particles having a hollow interior (hereinafter also referred to as "hollow silica fine particles") and an organosilicon compound to form a coating in the same manner as in the case of the primer layer or the hard coat layer described above. The reason why hollow silica fine particles are used here is that by the incorporation of a gas or a solvent having a lower refractive index than that of silica in the hollow interior, the refractive index of the hollow silica fine particles is decreased as compared with silica fine particles without a hollow, and as a result, an excellent antireflection effect can be imparted. The hollow silica fine particles can be produced by the method described in JP-A-2001-233611 or the like, however, it is preferred that hollow silica fine particles having an average particle diameter of from 1 to 150 nm and a refractive index of from 1.16 to 1.39 are used. Further, as the organosilicon compound, a compound represented by the above-mentioned formula (1) can be preferably used. The thickness of the antireflection layer is preferably from 50 to 150 nm. When the thickness falls outside the range and is too large or too small, a sufficient antireflection effect may not be obtained.

In addition, for the purpose of improving the water and oil repellency of the surface of the lens, an antifouling layer composed of an organosilicon compound containing fluorine is further formed on the surface of the antireflection layer. As the organosilicon compound containing fluorine, any of the fluorine-containing silane compounds described in JP-A-2005-301208 and JP-A-2006-126782 can be preferably used.

A method in which a water-repellent treatment liquid prepared by dissolving such a fluorine-containing silane compound in an organic solvent and adjusting to have a given concentration is applied to the surface of an organic antireflection layer can be adopted. As the application method, a dipping method, a spin coating method, or the like can be employed. It is also possible to form the antifouling layer by a dry method such as a vacuum vapor deposition method after filling a metal pellet with the water-repellent treatment liquid.

The thickness of the antifouling layer is not particularly limited, however, it is preferably from 0.001 to 0.5 μm, and more preferably from 0.001 to 0.03 μm. When the thickness of the antifouling layer is too small, the water and oil repellent effect becomes poor, and when the thickness is too large, the surface becomes sticky, and therefore it is not preferred. Further, when the thickness of the antifouling layer is larger than 0.03 μm, the antireflection effect is decreased, and therefore it is not preferred.

According to this embodiment, a substrate having a high refractive index of 1.7 or higher is used and a primer layer is formed from the above-mentioned components (A) to (C) in the surface treatment step, and therefore, a plastic lens for spectacles, which is very thin and excellent in impact resistance and has few interference fringes can be provided.

Further, when the metal oxide fine particles as the component (B) are surface-treated with an organosilicon compound having an alkyl group, the compatibility with a polyurethane resin is improved, and as a result, the homogeneity is improved. Therefore, the occurrence of interference fringe is prevented and also the impact resistance of a spectacle lens is further improved in the end. Further, when the organosilicon compound as the component (C) has an epoxy group, the adhesion to the plastic substrate and the hard coat layer is further improved, and the scratch resistance and impact resistance are further improved.

In general, when the refractive index of a primer layer is increased in accordance with the refractive index of a lens substrate, it is difficult to increase the refractive index of a hard coat layer, therefore, a difference in the refractive index between the primer layer and the hard coat layer becomes large. As a result, an interference fringe is liable to be caused. However, in the primer layer according to the invention, an interference fringe is difficult to be caused. The reason is presumably that the refractive index of the primer layer according to the invention decreases from the inner layer toward the surface layer, and a difference in the refractive index between the outermost surface of the primer layer and the hard coat layer becomes small. In particular, the effect is significant when the average particle diameters of the component (A) and the component (B) are from 5 to 50 nm, respectively, and the average particle diameter of the component (C) is 5 nm or less. Accordingly, it is not necessary to increase the refractive index of the hard coat layer by force and the degree of freedom of the designing of the hard coat layer is increased.

Second Embodiment

This embodiment is different from the first embodiment only in the constitution of the primer layer.

Constitution of Primer Layer

Figure 1:
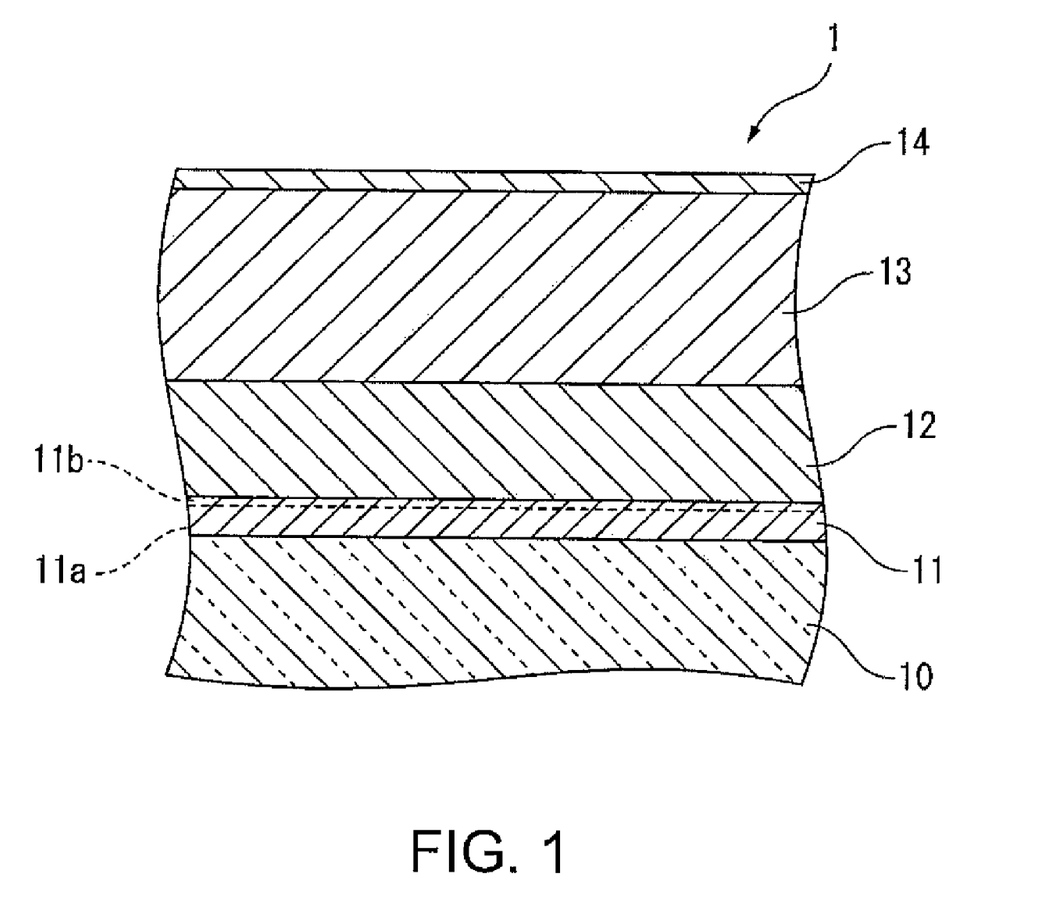

The FIGURE schematically shows an optical article according to an embodiment of the invention. A plastic lens 1 according to this embodiment has a plastic lens substrate 10, a first layer 11 which is formed on the surface of the plastic lens substrate 10 and in contact with the plastic lens substrate 10, a second layer 12 which is formed on the surface of the first layer 11 and in contact with the first layer 11, and a hard coat layer 13 which is formed on the surface of the second layer 12 and in contact with the second layer 12. Further, because the plastic lens 1 according to this embodiment is a spectacle lens, the plastic lens 1 further has an antireflection layer 14 which is formed on the surface of the hard coat layer 13 and in contact with the hard coat layer 13. Further, an antifouling layer may be provided on the surface of the antireflection layer 14.

The first layer 11 is a layer having a refractive index decreasing in the direction away from the plastic substrate 10. A typical example of the first layer 11 is a layer formed from a first material containing (A) a polyurethane resin, (B) metal oxide fine particles and (C) an organosilicon compound. The mechanism of expression of the refractive index gradient in the first layer 11 formed from the first material is presumed as follows. During drying after applying the first material to the lens substrate, the polyurethane resin as the component (A) is cured relatively faster than the metal oxide fine particles as the component (B) in the surface layer. Thereafter, the metal oxide fine particles as the component (B) are cured together with the component (A) gradually toward the inner layer. Accordingly, a layer in which the content of the component (A) is relatively high in the surface layer and the content of the component (B) is relatively high in the inner layer is formed. That is, a layer having a refractive index decreasing in the direction away from the plastic substrate is formed.

Further, the first material contains not only the polyurethane resin as the component (A) and the metal oxide fine particles as the component (B), but also the organosilicon compound as the component (C). Therefore, a space portion in the first layer is filled with the organosilicon compound (component (C)), and thus the density of the inner layer of the first layer is increased. As the component (B), titanium oxide may be used. However, even without using titanium oxide, or by incorporating only a small amount of titanium oxide therein, the refractive index of the first layer 11 can be improved and the occurrence of interference fringe can be prevented. Further, when the used amount of titanium oxide is decreased, the photocatalytic action is also decreased, and the light resistance is improved. Further, because the first material contains the polyurethane resin (component (A)), the first layer 11 formed from the first material contributes also to the improvement of impact resistance. The first layer 11 can be formed by, for example, a dip coating method, a spin coating method, a spray coating method or the like.

Another example of the first layer having a refractive index decreasing in the direction away from the plastic substrate is a layer formed by an ink-jet method. That is, a plurality of (two or more) substances having a different refractive index are formed into fine liquid droplets and applied to the plastic substrate while controlling the discharge ratio of these substances, whereby the first layer having a refractive index decreasing continuously or stepwise in the direction away from the plastic substrate can be formed.

Still another example of the first layer having a refractive index decreasing in the direction away from the plastic substrate is a layer formed by a CVD method. That is, a plurality of (two or more) substances having a different refractive index are deposited on the plastic substrate such that the deposition ratio of these substances are changed in the thickness direction, whereby the first layer having a refractive index decreasing continuously or stepwise in the direction away from the plastic substrate can be formed.

Still another example of the first layer having a refractive index decreasing in the direction away from the plastic substrate is a layer formed by an ion plating method. That is, during the film formation, a reactive gas is introduced while controlling the introduction amount thereof, whereby the refractive index of the formed layer is changed in the thickness direction. In this way, the first layer having a refractive index decreasing continuously or stepwise in the direction away from the plastic substrate can be formed.

As shown in the FIGURE, the first layer 11 and the second layer 12 are provided between the plastic lens substrate 10 and the hard coat layer 13, and serve as a primer layer having adhesion and impact resistance as a whole. The first layer 11 serves mainly as a primer layer for adjusting the refractive index (refractive index adjusting layer) as well as providing adhesion. The first layer 11 is referred to as a first primer layer. The first primer layer 11 has a refractive index decreasing in the direction away from the plastic lens substrate 10. It is preferred that a difference between the refractive index of the first primer layer 11 in the vicinity of the plastic lens substrate 10 or at the boundary (interface or underlayer) and the refractive index of the plastic lens substrate 10 is 0.01 or less. In this embodiment, the refractive index of the inner layer (a portion on the side of the plastic lens substrate 10) 11a of the first primer layer 11 is, for example, nearly equal to the refractive index of the plastic lens substrate 10.

The second layer 12 serves mainly as a primer layer for absorbing impact (impact absorbing layer) as well as providing adhesion between the plastic lens substrate 10 and the hard coat layer 13. Hereinafter, the second layer 12 is referred to as a second primer layer. The second primer layer 12 has a refractive index not higher than that of the surface layer 11b of the first primer layer 11. In this embodiment, the refractive index of the second primer layer 12 is, for example, nearly equal to the refractive index of the surface layer 11b of the first primer layer 11.

The hard coat layer 13 is a layer for imparting scratch resistance and abrasion resistance. The hard coat layer 13 is formed such that it is harder than the first primer layer 11 and the second primer layer 12. The hard coat layer 13 has a refractive index smaller than that of the plastic lens substrate 10. In this embodiment, the refractive index of the hard coat layer 13 is, for example, nearly equal to the refractive index of the second primer layer 12.

Accordingly, the spectacle lens 1 according to this embodiment includes the primer layer (the first primer layer and the second primer layer) as a coat layer for imparting impact resistance, adhesion and the like, and the hard coat layer as a coat layer for imparting scratch resistance and abrasion resistance. The primer layer (the first primer layer and the second primer layer) may be defined as a layer provided on the side of the lens substrate closer than the hard coat layer for securing adhesion. The hard coat layer may be defined as a layer provided on the outer side (on the opposite side of the lens substrate) than the primer layer for securing scratch resistance and abrasion resistance. Further, the hard coat layer may be defined as a layer harder than the primer layer (the first primer layer and the second primer layer)

Formation of Primer Layer

The first primer layer 11 is formed from, for example, a first material (a first coating composition, a first primer composition, or a first film composition) containing the following components (A) to (C):

(A) a polyurethane resin;
(B) metal oxide fine particles (a metal oxide sol); and
(C) an organosilicon compound.

Not only the component (B), but also the component (A) and the component (C) are present as fine particles in the coating composition. In this case, it is preferred that the average particle diameters of the component (A) and the component (B) are from about 5 to 50 nm, respectively, and the average particle diameter of the component (C) is about 5 nm or less. By doing this, the refractive index of the first primer layer 11 in the vicinity of the plastic lens substrate 10 can be further increased. As a result, even when the plastic lens substrate 10 having a high refractive index of 1.7 or higher is used, the occurrence of interference fringe can be effectively prevented.

The mechanism of this action is presumed as follows. In the absence of the organosilicon compound as the component (C), even when the refractive index of the metal oxide fine particles as the component (B) is increased or the ratio thereof in the primer layer is increased, the refractive index of the first primer layer 11 is not improved so much. On the other hand, the average particle diameters of the components (A) to (C) are controlled as described above, the component (C) enters a space (a space portion) formed by the particles composed of the component (A) and the particles composed of the component (B). As a result, the first primer layer 11 becomes a denser layer and the refractive index is improved. That is, the component (C) is considered to contribute to the improvement of refractive index.

The polyurethane resin as the component (A) is an organic resin component, and exhibits favorable adhesion between the plastic lens substrate 10 and the hard coat layer 13. Further, the polyurethane resin has a superior effect of improving light resistance and impact resistance as compared with the case where another resin such as a polyester resin is used. The polyurethane resin as the component (A) is not particularly limited and is the same as the component (A) in the first embodiment.

The polyurethane resin as the component (A) is present as fine particles in the first material (first coating composition), and the average particle diameter thereof is preferably from 5 to 50 nm as described above, and more preferably from 20 to 30 nm. When the average particle diameter of the polyurethane resin is less than 5 nm or exceeds 50 nm, a synergistic effect with the component (B) or the component (C), which will be mentioned later, cannot be exhibited, and it becomes difficult to effectively improve the refractive index of the first primer layer 11. The particle diameter of the polyurethane resin as the component (A) can be controlled by the production condition or molecular weight of the polyurethane resin, the stirring speed for the first material (first coating composition) or the like. Incidentally, the average particle diameter of the polyurethane resin in the form of fine particles as the component (A) can be measured by a light scattering method.

The blending amount of the polyurethane resin as the component (A) (the ratio of the component (A) to the first material (first coating composition), or the ratio of the component (A) to the total components (A) to (C)) is preferably from 20 to 60% by mass and more preferably from 30 to 50% by mass. In the case where the optical article 1 is a spectacle lens as this embodiment, when the blending amount of the polyurethane resin as the component (A) is less than 20% by mass, the impact resistance or light resistance of the optical article 1 as a final product may be insufficient. Further, when the blending amount of the polyurethane resin as the component (A) exceeds 60% by mass, the refractive index of the first primer layer 11 is decreased, and an interference fringe is liable to be caused. Further, in the case where the optical article 1 is a spectacle lens, the appearance of the spectacle lens 1 may be deteriorated.

Preferred specific examples of the polyurethane resin as the component (A) include NeoRez R-960 (manufactured by Zeneca), Hydran AP-30 (manufactured by Dainippon Ink & Chemicals, Inc.), Superflex 210 (manufactured by Dai-ichi Kogyo Seiyaku Co., Ltd.), Izelax S-1020 (manufactured by Hodogaya Chemical Co., Ltd.), Neotan UE-5000 (manufactured by Toagosei Co., Ltd.), RU-40 series (manufactured by Stal Japan), WF-41 series (manufactured by Stal Japan), and WPC-101 (manufactured by Japan Urethane Industry).

The metal oxide fine particles as the component (B) not only contribute to the refractive index of the first primer layer 11, but also contribute to the improvement of water resistance, weather resistance, and light resistance by serving as a filler to increase the crosslink density of the first primer layer 11.

Preferred metal oxide fine particles as the component (B) in this embodiment are the same as those as the component (B) in the first embodiment.

The blending amount of the metal oxide fine particles as the component (B) (the ratio of the component (B) to the first material (first coating composition) or the ratio of the component (B) to the total components (A) to (C)) is preferably from 40 to 80% by mass, and more preferably from 50 to 60% by mass. When the blending amount is too small, the refractive index and abrasion resistance of the first primer layer 11 may be insufficient in some cases. On the other hand, when the blending amount is too large, the impact resistance may be decreased, or a crack may be caused in the first primer layer 11. In addition, upon dyeing, the dyeability may be decreased. By setting the ratio of the metal oxide fine particles as the component (B) to the total components (A) to (C) to 40 to 80% by mass, the refractive index of the first primer layer 11 can be sufficiently increased and the crosslink density of the first primer layer 11 can be kept adequately, and further, the hardness and impact resistance are not deteriorated.

The organosilicon compound as the component (C) is filled in a space portion in the first primer layer 11 thereby increasing the density of the entire first primer layer 11 and contributing to the improvement of the refractive index. As the organosilicon compound being the component (C), for example, a compound represented by the formula (1) in the first embodiment can be preferably used.

The blending amount of the organosilicon compound as the component (C) (the ratio of the component (C) to the first material (first coating composition) or the ratio of the component (C) to the total components (A) to (C)) is preferably from 0.1 to 10% by mass. When the ratio of the organosilicon compound as the component (C) is less than 0.1% by mass, the adhesion between the plastic lens substrate 10 and the hard coat layer 13 is not sufficiently exhibited, and further a space portion cannot be completely filled, and thus, the refractive index may not be improved. On the other hand, when the ratio of the organosilicon compound as the component (C) exceeds 10% by mass, the abrasion resistance may be decreased, and the organosilicon compound is to be present in an excess amount relative to the space portion, and thus, the refractive index may be decreased.

In applying the above-mentioned first material (first coating composition or first primer composition) to the plastic lens substrate 10, it is effective to previously treat the surface of the plastic lens substrate 10 through an alkali treatment, an acid treatment, a surfactant treatment, a peeling or polishing treatment with inorganic or organic fine particles, or a plasma treatment for the purpose of improving the adhesion between the plastic lens substrate 10 and the first primer layer 11.

Further, as one example of applying and curing method of the above-mentioned first material, a method in which the first material is applied using a dipping method, a spin coating method, a spray coating method, a roll coating method, a flow coating method or the like, and the resulting coating is dried by heating at a temperature of from 40 to 200° C. for several hours can be exemplified. In this way, the first primer layer 11 can be formed from the first material.

If necessary, the first material (first coating composition or first primer composition) for forming the first primer layer 11 can be used by diluting with a solvent. Examples of the solvent include alcohols, esters, ketones, ethers and aromatic solvents. Further, if necessary, in addition to the above-mentioned components, a small amount of a metal chelate compound, a surfactant, an antistatic agent, an ultraviolet absorber, an antioxidant, a disperse dye, an oil-soluble dye, a pigment, a photochromic compound, a hindered amine-based or hindered phenol-based light resistance and heat resistance stabilizer or the like can be added to the first material thereby improving the coating property of the first material (coating liquid), curing rate and coating performances after curing.

Further, the first primer layer 11 preferably has a thickness of from 0.05 to 1 μm, more preferably from 0.05 to 0.1 μm. When the thickness of the first primer layer 11 is too small, the water resistance, impact resistance and the like may be decreased. On the other hand, when the thickness is too large, surface smoothness may be deteriorated, or appearance defects such as optical strain, white turbidity or clouding may be caused in some cases.

When the above-mentioned first material is applied to the plastic lens substrate 10, the first primer layer 11 having a refractive index decreasing in the direction away from the plastic lens substrate 10 can be formed. From the viewpoint of the prevention of occurrence of interference fringe, a difference between the refractive index of the first primer layer 11 in the vicinity of the plastic lens substrate 10 and the refractive index of the plastic lens substrate 10 is preferably 0.01 or less. Also, a difference between the refractive index of the surface layer (in the vicinity of the second primer layer 12) of the first primer layer 11 and the refractive index of the second primer layer 12 is preferably 0.01 or less.

3. Second Primer Layer

The second primer layer 12 is formed on the surface of the first primer layer 11 and has a property of exhibiting impact resistance. Further, the second primer layer 12 has a property of exhibiting adhesion between the plastic lens substrate 10 and the hard coat layer 13.

The second primer layer 12 is formed from, for example, a second material (second coating composition or second primer composition) containing the following components (D) and (E):

(D) a urethane, ester, epoxy, acrylic or silicone organic resin; and (E) metal oxide fine particles (a metal oxide sol).

The organic resin (organic resin component) as the component (D) exhibits a favorable adhesion between the plastic lens substrate 10 and the hard coat layer 13. The metal oxide fine particles as the component (E) contribute to the refractive index of the second primer layer 12 and also contribute to the improvement of water resistance, weather resistance, and light resistance by serving as a filler to increase the crosslink density of the second primer layer 12.

An urethane organic resin containing an urethane bond, an ester organic resin containing an ester bond or the like has a polar group in the main chain skeleton. Further, an epoxy organic resin containing an epoxy group or the like has a polar group introduced into a moiety branched from the main chain skeleton. When the second material contains an organic resin having a polar group as the component (D), such a polar group causes an interaction with a thiourethane bond or an episulfide group of the surface of the plastic lens substrate 10, and an epoxy group or a silanol group of the surface of the hard coat layer 13, and an excellent adhesion is exhibited. In order to achieve more favorable adhesion, the organic resin as the component (D) is preferably a urethane or ester organic resin.

As the metal oxide fine particles as the component (E), the same metal oxide fine particles as those used as the component (B) can be used. By using composite oxide fine particles containing titanium oxide having a rutile-type crystal structure as the metal oxide fine particles being the component (E), the second primer layer 12 excellent in weather resistance and light resistance can be formed. Further, because the rutile type has a higher refractive index than the anatase type, the content of the metal oxide fine particles as the component (E) in the second primer layer 12 can be reduced, and the amount of the component (D) (organic resin) which contributes to impact resistance and adhesion can be increased.

Further, the requirement of increasing the refractive index of the second primer layer 12 according to this embodiment is relieved due to the first primer layer 11. Accordingly, the content of the metal oxide fine particles as the component (E) can be reduced in the second primer layer 12. Even when the metal oxide fine particles containing tin oxide which has a less photocatalytic action than titanium oxide are used, the content thereof can be reduced, and durability and impact absorbing function as well as light resistance can be improved.

As one example of applying and curing method of the above-mentioned second material, a method in which the second material is applied using a dipping method, a spin coating method, a spray coating method, a roll coating method, a flow coating method or the like, and the resulting coating is dried by heating at a temperature of from 40 to 200° C. for several hours can be exemplified. In this way, the second primer layer 12 can be formed from the second material.

If necessary, the second material (second coating composition or second primer composition) for forming the second primer layer 12 can be used by diluting with a solvent. Examples of the solvent include alcohols, esters, ketones, ethers and aromatic solvents. Further, if necessary, in addition to the above-mentioned components, a small amount of a metal chelate compound, a surfactant, an antistatic agent, an ultraviolet absorber, an antioxidant, a disperse dye, an oil-soluble dye, a pigment, a photochromic compound, a hindered amine-based or hindered phenol-based light resistance and heat resistance stabilizer or the like can be added to the second material thereby improving the coating property of the second material (coating liquid), curing rate and coating performances after curing.

Further, the second primer layer 12 preferably has a thickness of from 0.05 to 5.0 μm, more preferably from 2.0 to 3.0 μm. When the thickness of the second primer layer 12 is too small, the water resistance, impact resistance or the like may be decreased. On the other hand, when the thickness is too large, surface smoothness may be deteriorated, or appearance defects such as optical strain, white turbidity or clouding may be caused in some cases. By setting the thickness of the second primer layer 12 to a value in the above-mentioned range, favorable impact resistance can be obtained. From the viewpoint of the prevention of occurrence of interference fringe, a difference in the refractive index between the second primer layer 12 and the hard coat layer 13 is preferably 0.01 or less.

According to this embodiment, the plastic substrate 10 having a high refractive index of 1.7 or higher can be used, and further, the first primer layer 11, the second primer layer 12 and the hard coat layer 13 are formed on the plastic substrate 10, therefore, an optical article (a plastic lens for spectacles) 1, which is very thin and excellent in impact resistance and has few interference fringes can be provided.

In general, when the refractive index of a primer layer is increased in accordance with the refractive index of a plastic lens substrate, a difference in the refractive index between the primer layer and the hard coat layer becomes large, and therefore, an interference fringe is liable to be caused. This is because it is difficult to increase the refractive index of a hard coat layer. On the other hand, according to this embodiment, an interference fringe is difficult to be caused. The reason is presumably that the refractive index of the first primer layer 11 according to this embodiment decreases from the inner layer 11a toward the surface layer 11b, and a difference in the refractive index between the outermost surface of the first primer layer 11 and the hard coat layer 13 becomes small. In particular, the effect is significant when the average particle diameters of the component (A) and the component (B) are from 5 to 50 nm, respectively, and the average particle diameter of the component (C) is 5 nm or less. Accordingly, it is not necessary to increase the refractive index of the hard coat layer 13 by force and the degree of freedom of the designing of the hard coat layer 13 is increased.

EXAMPLES

Subsequently, Examples and Comparative Examples based on an embodiment of the present invention will be described. Specifically, plastic lenses for spectacles were prepared by the methods described below, and various properties such as interference fringe and scratch resistance were evaluated. Here, Examples 1 to 7 correspond to the first embodiment, and Examples 8 to 11 correspond to the second embodiment. The results of Examples 1 to 4 are shown in Table 1, the results of Examples 5 to 7 are shown in Table 2, and the results of Examples 8 to 11 are shown in Tables 3 and 4.

Example 1

(1) Production of Plastic Lens Substrate

Under a nitrogen atmosphere, 90 parts by mass of bis(β-epithiopropyl)disulfide and 10 parts by mass of sulfur were mixed and stirred at 100° C. for 1 hour. After the resulting mixture was cooled, 0.05 part by mass of tetrabutyl ammonium bromide as a catalyst was added to the mixture to form a homogeneous liquid. Then, the homogeneous liquid was filtered through a PTFE filter having a pore size of 0.5 μm, cast into a glass mold for molding a lens with a thickness of 1.2 mm, and cured by polymerization by raising the temperature from 10° C. to 120° C. over 22 hours in an oven, whereby a lens substrate was produced. The resulting lens substrate had a refractive index of 1.76 and an Abbe's number of 33. Further, the lens substrate was transparent and showed a favorable surface condition.

(2) Preparation of Primer Composition 6268 parts by mass of methyl alcohol and 100 parts by mass of a 0.1 N aqueous solution of sodium hydroxide were placed in a stainless steel vessel, followed by sufficiently stirring. Then, 2700 parts by mass of a composite fine particle sol mainly containing titanium oxide, tin oxide and silicon oxide (rutile-type crystal structure, methanol dispersion, surface treatment agent: methyltrimethoxysilane, total solid content: 20% by mass, manufactured by Catalysts & Chemicals Industries Co., Ltd., trade name: Optolake) was added thereto, followed by stirring and mixing. Then, 815 parts by mass of a polyurethane resin (water dispersion, total solid content: 35% by mass, manufactured by Dai-ichi Kogyo Seiyaku Co., Ltd., trade name: Superflex 210 (424 parts by mass), and water dispersion, total solid content: 38% by mass, manufactured by Dai-ichi Kogyo Seiyaku Co., Ltd., trade name: Superflex 460 (391 parts by mass)), and 97 parts by mass (7% by mass in the primer layer) of phenyltrimethoxysilane (trade name: KBM-103 manufactured by Shin-Etsu Chemical Co., Ltd.), were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a primer composition was obtained.

In the composition in this Example, and Examples 2 to 11 and Comparative example 1, which will be mentioned later, the average particle diameter of the polyurethane resin (component (A)) was 25 nm, the average particle diameter of the metal oxide fine particles (component (B)) was 20 nm, and the average particle diameter of fine particles formed from the organosilicon compound (component (C)) was 1 nm or less. The average particle diameters of these particles were obtained by scattering particles of each component in a solvent under the same condition as that in each Example, measuring particle diameters using a dynamic light scattering particle size distribution analyzer (manufactured by Horiba Seisakusho K.K., trade name: LB-550), and calculating the average particle diameters using the number of the particles as the particle size standard.

Further, the film thickness and the refractive index distribution of the primer layer were obtained by measuring the reflectance spectra of the primer layer and hard coat layer on the plastic lens substrate using a reflective film thickness monitor (manufactured by Otsuka Electronics Co., Ltd., trade name: FE-3000). Specifically, curve fitting by the least-squares method was applied to the obtained reflectance spectral data, and the film thickness and the refractive index distribution in the thickness direction of primer layer were obtained.

(3) Preparation of Hard Coat Composition 1000 parts by mass of propylene glycol monomethyl ether and 1200 parts by mass of γ-glycidoxypropyltrimethoxysilane were added to a stainless steel vessel, followed by sufficiently stirring. Then, 300 parts by mass of a 0.1 mol/L aqueous solution of hydrochloric acid was added thereto, followed by stirring for a whole day and night, whereby a silane hydrolysate was obtained. To this silane hydrolysate, 30 parts by mass of a silicone surfactant (manufactured by Dow Corning Toray Co., Ltd., trade name: FZ-2164) was added, followed by stirring for 1 hour. Then, 7300 parts by mass of a composite fine particle sol mainly containing titanium oxide, tin oxide and silicon oxide (rutile-type crystal structure, methanol dispersion, surface treatment agent: γ-glycidoxypropyltrimethoxysilane, manufactured by Catalysts & Chemicals Industries Co., Ltd., trade name: Optolake) was added thereto, followed by stirring and mixing for 2 hours. Then, 250 parts by mass of an epoxy resin (manufactured by Nagase Kasei Kogyo K.K., trade name: EX-313) was added thereto, followed by stirring for 2 hours. Then, 20 parts by mass of iron (III) acetylacetonate was added thereto, followed by stirring for 1 hour, and then, the resulting mixture was filtered through a filter having a pore size of 2 μm, whereby a hard coat composition was obtained.

(4) Formation of Primer Layer and Hard Coat Layer

First, the plastic lens substrate obtained in the above-mentioned (1) was subjected to an alkali treatment. Specifically, the plastic lens substrate was dipped in a 2 mol/L aqueous solution of potassium hydroxide maintained at 50° C. for 5 minutes, and then rinsed with pure water. Then, the plastic lens substrate was dipped in 1.0 mol/L sulfuric acid maintained at 25° C. for 1 minute to perform a neutralization treatment. Then, the plastic lens substrate was rinsed with pure water, dried and left stand for cooling.

Then, the lens substrate was dipped in the primer composition prepared in the above-mentioned (2), dip-coated at a withdrawal rate of 400 mm/min, and baked at 70° C. for 20 minutes, whereby a primer layer was formed on the surface of the substrate such that the thickness of the layer after drying became 700 nm. Subsequently, the lens substrate having the primer layer formed thereon was dipped in the hard coat composition prepared in the above-mentioned (3), dip-coated at a withdrawal rate of 400 mm/min, and dried and baked at 80° C. for 30 minutes, whereby a hard coat layer was formed such that the thickness of the layer became 2100 nm. Thereafter, the lens substrate thus treated was heated in an oven maintained at 125° C. for 3 hours, whereby a plastic lens having the primer layer and the hard coat layer formed thereon was obtained. The refractive indices of the inner layer and the surface layer of this primer layer were 1.736 and 1.48, respectively.

(5) Formation of Antireflection Layer

The plastic lens having the primer layer and the hard coat layer formed thereon was subjected to a plasma treatment (argon plasma 400 W×60 sec), and a multilayered antireflection layer composed of five layers of $SiO_2$, $ZrO_2$, $SiO_2$, $ZrO_2$ and $SiO_2$ in the order from the substrate side to the air side was formed using a vacuum deposition device (manufactured by Shincron Co., Ltd.). Each layer was formed such that the optical film thicknesses of the first $SiO_2$ layer, the second and third $ZrO_2$ and $SiO_2$ equivalent film layers, the fourth $ZrO_2$ layer and the outermost fifth $SiO_2$ layer were $\lambda/4$, respectively, at a design wavelength $\lambda$ of 520 nm.

Example 2

A plastic lens was produced in the same manner as in Example 1 except that the primer composition was prepared as follows. The refractive indices of the inner layer and the surface layer of this primer layer were 1.741 and 1.48, respectively.

6248 parts by mass of methyl alcohol and 100 parts by mass of a 0.1 N aqueous solution of sodium hydroxide were placed in a stainless steel vessel, followed by sufficiently stirring. Then, 2700 parts by mass of a composite fine particle sol mainly containing titanium oxide, tin oxide and silicon oxide (rutile-type crystal structure, methanol dispersion, surface treatment agent: methyltrimethoxysilane, total solid content: 20% by mass, manufactured by Catalysts & Chemicals Industries Co., Ltd., trade name: Optolake) was added thereto, followed by stirring and mixing. Then, 815 parts by mass of a polyurethane resin (water dispersion, total solid content: 35% by mass, manufactured by Dai-ichi Kogyo Seiyaku Co., Ltd., trade name: Superflex 210 (424 parts by mass), and water dispersion, total solid content: 38% by mass, manufactured by Dai-ichi Kogyo Seiyaku Co., Ltd., trade name: Superflex 460 (391 parts by mass)), and 117 parts by mass (7% by mass in the primer layer) of phenyltriethoxysilane (trade name: KBE-103 manufactured by Shin-Etsu Chemical Co., Ltd.), were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a primer composition was obtained.

Example 3

A plastic lens was produced in the same manner as in Example 1 except that the primer composition was prepared as follows. The refractive indices of the inner layer and the surface layer of this primer layer were 1.742 and 1.48, respectively.

6287 parts by mass of methyl alcohol and 100 parts by mass of a 0.1 N aqueous solution of sodium hydroxide were placed in a stainless steel vessel, followed by sufficiently stirring. Then, 2700 parts by mass of a composite fine particle sol mainly containing titanium oxide, tin oxide and silicon oxide (rutile-type crystal structure, methanol dispersion, surface treatment agent: methyltrimethoxysilane, total solid content: 20% by mass, manufactured by Catalysts & Chemicals Industries Co., Ltd., trade name: Optolake) was added thereto, followed by stirring and mixing. Then, 815 parts by mass of a polyurethane resin (water dispersion, total solid content: 35% by mass, manufactured by Dai-ichi Kogyo Seiyaku Co., Ltd., trade name: Superflex 210 (424 parts by mass), and water dispersion, total solid content: 38% by mass, manufactured by Dai-ichi Kogyo Seiyaku Co., Ltd., trade name: Superflex 460 (391 parts by mass)), and 77 parts by mass (7% by mass in the primer layer) of diphenyldimethoxysilane (trade name: KBM-202SS manufactured by Shin-Etsu Chemical Co., Ltd.), were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a primer composition was obtained.

Example 4

A plastic lens was produced in the same manner as in Example 1 except that the primer composition was prepared as follows. The refractive indices of the inner layer and the surface layer of this primer layer were 1.760 and 1.48, respectively.

6242 parts by mass of methyl alcohol and 100 parts by mass of a 0.1 N aqueous solution of sodium hydroxide were placed in a stainless steel vessel, followed by sufficiently stirring. Then, 2700 parts by mass of a composite fine particle sol mainly containing titanium oxide, tin oxide and silicon oxide (rutile-type crystal structure, methanol dispersion, surface treatment agent: methyltrimethoxysilane, total solid content: 20% by mass, manufactured by Catalysts & Chemicals Industries Co., Ltd., trade name: Optolake) was added thereto, followed by stirring and mixing. Then, 716 parts by mass of a polyurethane resin (water dispersion, total solid content: 35% by mass, manufactured by Dai-ichi Kogyo Seiyaku Co., Ltd., trade name: Superflex 210 (372 parts by mass), and water dispersion, total solid content: 38% by mass, manufactured by Dai-ichi Kogyo Seiyaku Co., Ltd., trade name: Superflex 460 (343 parts by mass)), and 77 parts by mass (11% by mass in the primer layer) of diphenyldimethoxysilane (trade name: KBM-202SS manufactured by Shin-Etsu Chemical Co., Ltd.), were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a primer composition was obtained.

Example 5

A plastic lens was produced in the same manner as in Example 1 except that the primer composition was prepared as follows.

2900 parts by mass of methyl alcohol and 50 parts by mass of a 0.1 N aqueous solution of sodium hydroxide were placed in a stainless steel vessel, followed by sufficiently stirring. Then, 1500 parts by mass of a composite fine particle sol mainly containing titanium oxide, tin oxide and silicon oxide (rutile-type crystal structure, methanol dispersion, surface treatment agent: γ-glycidoxypropyltrimethoxysilane, total solid content: 20% by mass, manufactured by Catalysts & Chemicals Industries Co., Ltd., tradename: Optolake) was added thereto, followed by stirring and mixing. Then, 580 parts by mass of a polyurethane resin (water dispersion, total solid content: 35% by mass, average particle diameter: 60 nm), and 35 parts by mass of γ-glycidoxypropyltrimethoxysilane were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a primer composition was obtained.

In the plastic lens having a primer layer obtained by using this primer composition, the level of interference fringe was good, however, in the visual evaluation, the occurrence of white turbidity (clouding) was observed.

Example 6

A plastic lens was produced in the same manner as in Example 1 except that the primer composition was prepared as follows.

2900 parts by mass of methyl alcohol and 50 parts by mass of a 0.1 N aqueous solution of sodium hydroxide were placed in a stainless steel vessel, followed by sufficiently stirring. Then, 1500 parts by mass of a composite fine particle sol mainly containing titanium oxide, tin oxide and silicon oxide (rutile-type crystal structure, methanol dispersion, surface treatment agent: γ-glycidoxypropyltrimethoxysilane, total solid content: 20% by mass, average particle diameter: 55 nm) was added thereto, followed by stirring and mixing. Then, 580 parts by mass of a polyurethane resin (water dispersion, total solid content: 35% by mass, manufactured by Dai-ichi Kogyo Seiyaku Co., Ltd., trade name: Superflex 210), and 35 parts by mass of γ-glycidoxypropyltrimethoxysilane were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a primer composition was obtained.

In the plastic lens having a primer layer obtained by using this primer composition, the level of interference fringe was good, however, in the visual evaluation, the occurrence of white turbidity (clouding) was observed.

Example 7

A plastic lens was produced in the same manner as in Example 1 except that the primer composition was prepared as follows.

2900 parts by mass of methyl alcohol and 50 parts by mass of a 0.1 N aqueous solution of sodium hydroxide were placed in a stainless steel vessel, followed by sufficiently stirring. Then, 1500 parts by mass of a composite fine particle sol mainly containing titanium oxide, tin oxide and silicon oxide (rutile-type crystal structure, methanol dispersion, surface treatment agent: γ-glycidoxypropyltrimethoxysilane, total solid content: 20% by mass, manufactured by Catalysts & Chemicals Industries Co., Ltd., trade name: Optolake) was added thereto, followed by stirring and mixing. Then, 580 parts by mass of a polyurethane resin (water dispersion, total solid content: 35% by mass, manufactured by Dai-ichi Kogyo Seiyaku Co., Ltd., trade name; Superflex 210), and 35 parts by mass of γ-glycidoxypropyltrimethoxysilane (average particle diameter: 7 nm) which had been treated in advance with an alkali catalyst so as to accelerate hydrolytic condensation were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a primer composition was obtained.

In the plastic lens having a primer layer obtained by using this primer composition, the level of interference fringe was somewhat good, and in the visual evaluation, the occurrence of white turbidity (clouding) was observed.

Example 8

Step (1) Production of Plastic Lens Substrate 10

Under a nitrogen atmosphere, 90 parts by mass of bis(β-epithiopropyl)disulfide and 10 parts by mass of sulfur were mixed and stirred at 100° C. for 1 hour. After the resulting mixture was cooled, 0.05 part by mass of tetrabutyl ammonium bromide was added to the mixture to form a homogeneous liquid. Then, the homogeneous liquid was filtered through a PTFE filter having a pore size of 0.5 μm, cast into a glass mold for molding a lens with a thickness of 1.2 mm, and cured by polymerization by raising the temperature from 10° C. to 120° C. over 22 hours in an oven, whereby a plastic lens substrate 10 was produced. The resulting plastic lens substrate 10 had a refractive index of 1.74 and an Abbe's number of 33. Further, the plastic lens substrate 10 was transparent and showed a favorable surface condition.

Step (2) Preparation of First Primer Composition (First Material)

2900 parts by mass of methyl alcohol and 50 parts by mass of a 0.1 N aqueous solution of sodium hydroxide were placed in a stainless steel vessel, followed by sufficiently stirring. Then, as the component (B), 1500 parts by mass of a composite fine particle sol mainly containing titanium oxide, tin oxide and silicon oxide (rutile-type crystal structure, methanol dispersion, surface treatment agent: γ-glycidoxypropyltrimethoxysilane, total solid content: 20% by mass, manufactured by Catalysts & Chemicals Industries Co., Ltd., trade name; Optolake) was added thereto, followed by stirring and mixing. Then, as the component (A), 580 parts by mass of a polyurethane resin (water dispersion, total solid content: 35% by mass, manufactured by Dai-ichi Kogyo Seiyaku Co., Ltd., trade name: Superflex 210) and as the component (C), 35 parts by mass of γ-glycidoxypropyltrimethoxysilane were added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a first primer composition (first coating composition or first material) was obtained.

Step (3) Preparation of Second Primer Composition (Second Material)

3700 parts by mass of methyl alcohol, 250 parts by mass of pure water, and 1000 parts by mass of propylene glycol monomethyl ether were placed in a stainless steel vessel, followed by sufficiently stirring. Then, as the component (E), 2800 parts by mass of a composite fine particle sol mainly containing titanium oxide, tin oxide and silicon oxide (rutile-type crystal structure, methanol dispersion, surface treatment agent: γ-glycidoxypropyltrimethoxysilane, total solid content: 20% by mass, manufactured by Catalysts & Chemicals Industries Co., Ltd., trade name: Optolake) was added thereto, followed by stirring and mixing. Then, as the component (D), 2200 parts by mass of a polyester resin (water dispersion, total solid content: 38% by mass) was added thereto, followed by stirring and mixing. Then, 2 parts by mass of a silicone surfactant (manufactured by Dow Corning Toray Co., Ltd., trade name: L-7604) was further added thereto, followed by stirring for a whole day and night, and then, the resulting mixture was filtered through a filter having a pore size of 2 μm, whereby a second primer composition (second coating composition or second material) was obtained.

Step (4) Preparation of Hard Coat Composition (Third Material)

1000 parts by mass of Butyl Cellosolve was placed in a stainless steel vessel, and then, 1200 parts by mass of γ-glycidoxypropyltrimethoxysilane was added thereto, followed by sufficiently stirring. Then, 300 parts by mass of a 0.1 mol/L aqueous solution of hydrochloric acid was added thereto, followed by stirring for a whole day and night, whereby a silane hydrolysate was obtained. To this silane hydrolysate, 30 parts by mass of a silicone surfactant (manufactured by Dow Corning Toray Co., Ltd., trade name: L-7001) was added, followed by stirring for 1 hour. Then, as a component (G), 7300 parts by mass of a composite fine particle sol mainly containing titanium oxide, tin oxide and silicon oxide (rutile-type crystal structure, methanol dispersion, surface treatment agent: γ-glycidoxypropyltrimethoxysilane, manufactured by Catalysts & Chemicals Industries Co., Ltd., trade name: Optolake) was added thereto, followed by stirring and mixing for 2 hours. Then, as a component (I), 250 parts by mass of an epoxy resin (manufactured by Nagase Kasei Kogyo K.K., trade name: EX-313) was added thereto, followed by stirring for 2 hours. Then, 20 parts by mass of iron (III) acetylacetonate was added thereto, followed by stirring for 1 hour, and then, the resulting mixture was filtered through a filter having a pore size of 2 μm, whereby a hard coat composition (third coating composition or third material) was obtained.

Step (5) Formation of First Primer Layer, Second Primer Layer, Hard Coat Layer, and Antireflection Layer The plastic lens substrate 10 having a diameter of 80 mm obtained in the above-mentioned (1) was subjected to an alkali treatment (the plastic lens substrate 10 was dipped in a 2 mol/L aqueous solution of potassium hydroxide maintained at 50° C. for 5 minutes and rinsed with pure water, and then, dipped in 1.0 mol/L sulfuric acid maintained at 25° C. for 1 minute to perform a neutralization treatment). Then, the plastic lens substrate 10 was rinsed with pure water, dried and left stand for cooling.

Then, the alkali-treated plastic lens substrate 10 was dipped in the first primer composition prepared in the above-mentioned (2), dip-coated at a withdrawal rate of 150 mm/min, and baked at 80° C. for 20 minutes, whereby a first primer layer 11 was formed on the surface of the plastic lens substrate 10.

Subsequently, the plastic lens substrate 10 having the first primer layer 11 formed thereon was dipped in the second primer composition prepared in the above-mentioned (3), dip-coated at a withdrawal rate of 220 mm/min, and baked at 80° C. for 20 minutes, whereby a second primer layer 12 was formed on the surface of the first primer layer 11.

Further, the plastic lens substrate 10 having the first primer layer 11 and the second primer layer 12 formed thereon was dipped in the hard coat composition prepared in the above-mentioned (4), dip-coated at a withdrawal rate of 400 mm/min, and baked at 80° C. for 30 minutes, whereby a hard coat layer 13 was formed on the surface of the second primer layer 12.

Thereafter, the plastic lens substrate 10 thus treated was heated in an oven maintained at 125° C. for 3 hours, whereby a plastic lens (work) having the first primer layer 11, the second primer layer 12 and the hard coat layer 13 formed thereon was obtained.

Subsequently, the work having the surface treatment layers (the first primer layer 11, the second primer layer 12 and the hard coat layer 13) formed thereon was subjected to a plasma treatment (argon plasma 400 W×60 sec), and a multilayered antireflection layer 14 composed of five layers of $SiO_2$, $ZrO_2$, $SiO_2$, $ZrO_2$ and $SiO_2$ in the order from the hard coat layer 13 side to the air side was formed using a vacuum deposition device (manufactured by Shincron Co., Ltd.). Each layer was formed such that the optical film thicknesses of the first $SiO_2$ layer, the second and third $ZrO_2$ and $SiO_2$ equivalent film layers, the fourth $ZrO_2$ layer and the outermost fifth $SiO_2$ layer were $\lambda/4$, respectively, at a design wavelength $\lambda$ of 520 nm. In this manner, a plastic lens 1 having the first primer layer 11, the second primer layer 12, the hard coat layer 13 and the antireflection layer 14 was produced.

Example 9

A plastic lens 1 was produced in the same manner as in Example 8 except that in the preparation of the first primer composition in the step (2) in Example 8, the composite fine particle sol (rutile-type crystal structure, methanol dispersion, surface treatment agent: γ-glycidoxypropyltrimethoxysilane, total solid content: 20% by mass, manufactured by Catalysts & Chemicals Industries Co., Ltd., trade name: Optolake) as the component (B) was changed to a composite fine particle sol (rutile-type crystal structure, methanol dispersion, surface treatment agent: methyltrimethoxysilane, total solid content: 20% by mass, manufactured by Catalysts & Chemicals Industries Co., Ltd., trade name: Optolake). Accordingly, also in Example 9, the plastic lens 1 having the first primer layer 11, the second primer layer 12, the hard coat layer 13 and the antireflection layer 14 was produced.

Example 10

A plastic lens 1 was produced in the same manner as in Example 8 except that in the preparation of the second primer composition in the step (3) in Example 8, the composite fine particle sol (rutile-type crystal structure, methanol dispersion, surface treatment agent: γ-glycidoxypropyltrimethoxysilane, total solid content: 20% by mass, manufactured by Catalysts & Chemicals Industries Co., Ltd., trade name: Optolake) as the component (E) was changed to a composite fine particle sol (rutile-type crystal structure, methanol dispersion, surface treatment agent: methyltrimethoxysilane, total solid content: 20% by mass, manufactured by Catalysts & Chemicals Industries Co., Ltd., trade name: Optolake). Accordingly, also in Example 10, the plastic lens 1 having the first primer layer 11, the second primer layer 12, the hard coat layer 13 and the antireflection layer 14 was produced.

Example 11

A plastic lens 1 was produced in the same manner as in Example 8 except that in the preparation of the second primer composition in the step (3) in Example 8, the polyester resin (water dispersion, total solid content: 38% by mass) as the component (D) was changed to a polyurethane resin (water dispersion, total solid content: 38% by mass, manufactured by Dai-ichi Kogyo Seiyaku Co., Ltd., trade name: Superflex 460). Accordingly, also in Example 11, the plastic lens 1 having the first primer layer 11, the second primer layer 12, the hard coat layer 13 and the antireflection layer 14 was produced.

With respect to the plastic lenses formed in Examples 8 to 11, the refractive index of the plastic lens substrate 10, the compositional ratios, film thicknesses and refractive indices of the respective layers 11 to 13 are summarized in Table 3.

The plastic lens substrate 10 of the plastic lens 1 formed in any of Examples 8 to 11 had a refractive index of 1.74.

The compositional ratio of the metal oxide filler (metal oxide fine particles) to the organic resin (the compositional ratio of the component (B) to the component (A)) in the first primer layer 11 was adjusted to 60:40, and the film thickness (layer thickness) of the first primer layer 11 was 100 nm, and the refractive indices of the inner layer 11a and the surface layer 11b of the first primer layer 11 were 1.74 and 1.65, respectively.

The compositional ratio of the metal oxide filler (metal oxide fine particles) to the organic resin (the compositional ratio of the component (E) to the component (D)) in the second primer layer 12 was adjusted to 40:60, and the film thickness (layer thickness) of the second primer layer 12 was 800 nm, and the refractive index of the second primer layer 12 was 1.65.

The compositional ratio of the metal oxide filler (metal oxide fine particles) to the organic resin in the hard coat layer 13 was adjusted to 60:40, and the film thickness (layer thickness) of the hard coat layer 13 was 2500 nm, and the refractive index of the hard coat layer 13 was 1.65. Incidentally, in the plastic lens 1 formed in Example 11, the refractive index of the second primer layer 12 was 1.64.

Comparative Example 1

A primer layer, a hard coat layer, and an antireflection layer were formed in the same manner as in Example 1 except that the primer layer was formed without using phenyltriethoxysilane in the preparation of the primer composition described in (2) in Example 2.

Comparative Example 2

A primer composition was prepared in the same manner as in Example 1 except that 580 parts by mass of a polyester resin (water dispersion, total solid content: 35% by mass) was used in place of 580 parts by mass of the polyurethane resin (water dispersion, total solid content: 35% by mass, manufactured by Dai-ichi Kogyo Seiyaku Co., Ltd., trade name: Superflex 210) in Example 2, and a plastic lens was obtained using this primer composition.

Evaluation Methods

The obtained respective plastic lenses were evaluated by the following respective methods. The results are shown in Table 1.

(a) Interference Fringe

An interference fringe on the plastic lens was observed under a three-wavelength fluorescent lamp (manufactured by Matsushita Electric Industrial Co., Ltd., trade name: National Palook) in a dark box, and evaluated by classifying into the following ranks.

○: An interference fringe is almost not observed and the level of interference fringe is good.

x: The occurrence of interference fringe is significant and the level of interference fringe is poor.

(b) Scratch Resistance

A steel wool (manufactured by Nihon Steel Wool Co., Ltd., trade name: Bon Star #0000) was applied to the surface of the plastic lens under a load of 9.8 N (1 kgf) and reciprocated 10 times. The degree of scratches within a range of 1 cm×3 cm was visually observed and evaluated by classifying into the following ranks.

A: Scratches are not observed at all.
B: 1 to 10 scratches are observed.
C: 11 to 100 scratches are observed.
D: Many scratches are observed, but smooth surface remains.
E: Due to the scratches on the surface, smooth surface does not remain.

(c) Initial Adhesion

The adhesion of the interface between the respective layers of the lens substrate, primer layer, hard coat layer and antireflection layer was evaluated by the cross-cut tape test in accordance with the cross-cut adhesion method and cross-cut tape method described in JIS K5400 8.5.1 to 2. That is, the surface of the substrate was cut at 1 mm intervals with a cutter knife to form 100 square pieces having a side length of 1 mm. Thereafter, a cellophane adhesive tape (manufactured by Nichiban Co., Ltd., trade name: Sellotape (registered trademark)) was strongly pressed onto the thus formed cross-cut part, and then the adhesive tape was quickly peeled from the surface in the direction of 90 degrees. The number of square pieces remaining on the coat film after peeling was counted and classified into the following ranks.

A: No film peeling occurs (number of remaining square pieces: 100).
B: Almost no film peeling occurs (number of remaining square pieces: 99 to 95).
C: A little film peeling occurs (number of remaining square pieces: 94 to 80).
D: Film peeling occurs (number of remaining square pieces: 79 to 30).
E: Almost entire surface is peeled off (number of remaining square pieces: 29 to 0).

(d) Light Resistance

The plastic lens was exposed to a carbon arc in a sunshine weather meter for 200 hours, and thereafter, a cross-cut tape test described in the above-mentioned (c) was performed, and the number of square pieces remaining on the coat film was used as a light resistance index.

(e) Moisture Resistance

The plastic lens was left in a constant temperature and humidity chamber maintained at a temperature of 60° C. and a relative humidity of 98% for 10 days, and thereafter, a cross-cut tape test described in the above-mentioned (c) was performed, and the number of square pieces remaining on the coat film was used as a moisture resistance index.

(f) Hot Water Resistance

The plastic lens was left in a hot bath maintained at a temperature of 90° C. for 90 minutes, and thereafter, a cross-cut tape test described in the above-mentioned (c) was performed, and the number of square pieces remaining on the coat film was used as a hot water resistance index.

(g) Impact Resistance

A falling ball test was performed according to the FDA standard. That is, a steel ball having a mass of 16.3 g was vertically dropped from a height of 67 cm onto the plastic lens, which was placed with the convex side facing up. When the plastic lens was not broken, the steel ball was dropped again by increasing the height from which the steel ball was dropped by 20 cm increments, and the height when the plastic lens was broken was determined. In the test, the thickness of the center of the plastic lens substrate was set to 1.1 mm.

TABLE 1

|  | Interference fringe | Scratch resistance | Initial adhesion | Light resistance | Moisture resistance | Hot water resistance | Impact resistance |
|---|---|---|---|---|---|---|---|
| Example 1 | ○ | B | A | A | A | A | 147 cm |
| Example 2 | ○ | B | A | A | A | A | 187 cm |
| Example 3 | ○ | B | A | A | A | A | 147 cm |
| Example 4 | ○ | B | A | A | A | A | 147 cm |
| Comparative example 1 | X | B | A | C | B | A | 107 cm |
| Comparative example 2 | X | B | A | C | C | B | 107 cm |

TABLE 2

|  | Interference fringe | White turbidity (clouding) |
|---|---|---|
| Example 5 | ○ | Δ |
| Example 6 | ○ | Δ |
| Example 7 | Δ | Δ |

TABLE 3

|  | Lens substrate | First primer layer (Refractive index adjusting layer) | | | | Second primer layer (Impact absorbing layer) | | | Hard coat layer | | |
|---|---|---|---|---|---|---|---|---|---|---|---|
|  | Refractive index | Main component* | Film thickness | Refractive index (inner layer) | Refractive index (surface layer) | Main component* | Film thickness | Refractive index | Main component* | Film thickness | Refractive index |
| Example 8 | 1.74 | 60/40 | 100 nm | 1.74 | 1.65 | 40/60 | 800 nm | 1.65 | 60/40 | 2500 nm | 1.65 |
| Example 9 |  | 60/40 | 100 nm | 1.74 | 1.65 | 40/60 | 800 nm | 1.65 |  |  |  |
| Example 10 |  | 60/40 | 100 nm | 1.74 | 1.65 | 40/60 | 800 nm | 1.65 |  |  |  |
| Example 11 |  | 60/40 | 100 nm | 1.74 | 1.65 | 40/60 | 800 nm | 1.64 |  |  |  |

*Main component: compositional ratio of (metal oxide filler/organic resin)

TABLE 4

|  | Interference fringe | Adhesion | Impact resistance |
|---|---|---|---|
| Example 8 | ○ | A | 167 cm |
| Example 9 | ○ | A | 167 cm |
| Example 10 | ○ | A | 167 cm |
| Example 11 | ○ | A | 167 cm |

Results

From Tables 1 and 2, it was found that an interference fringe was almost not observed in the spectacle lenses of Examples 1 to 7 having the primer layer according to the invention. Further, it was found that the spectacle lenses of Examples 1 to 4 are also excellent in the performances such as light resistance and impact resistance. In particular, in Examples 2 to 4, metal oxide fine particles surface-treated with an organosilicon compound having a methyl group are incorporated in the primer layer, therefore, the impact resistance is extremely superior. Further, in Example 3, the refractive index of the surface layer portion facing the hard coat layer of the primer layer is lower than that of the inner layer of the primer layer. Incidentally, the refractive index of the surface layer portion of the primer layer was 1.48 in the state where the hard coat layer was not formed, however, an interference fringe was almost not observed by the formation of the hard coat layer. The reason is not clear, but it is presumed that the surface layer portion of the primer layer has a sea-island structure with a large surface area, and when the refractive index of the primer layer is calculated, an air layer in the portion with a sea-island structure has an influence on the refractive index, whereby the refractive index shows a very low value. However, when the hard coat layer was formed, an interference fringe was not caused, therefore, it is considered that the refractive index of the surface layer portion of the primer layer was increased to about 1.65.

on the other hand, in Comparative example 1, an organosilicon compound was not contained in the coating composition for forming the primer layer, therefore, the refractive index of the primer layer could not be increased, and thus, the occurrence of interference fringe was significant. In addition, the light resistance and impact resistance were poor. In Comparative example 2, a polyester resin was incorporated in the primer layer in place of a polyurethane resin, and the occurrence of interference fringe was significant, and also the light resistance and impact resistance were poor.

Further, in the plastic lens 1 produced in any of Examples 8 to 11, an interference fringe was not caused. The reason is presumably that the refractive index was adjusted in the first primer layer 11. That is, the plastic lens 1 produced in any of Examples 8 to 11 has the first primer layer 11, and therefore, there was not a large difference in the refractive index in the interfaces from the plastic lens substrate 10 to the hard coat layer 13, and the refractive index changes almost continuously. It is considered that due to this, the occurrence of interference fringe in the interface between the plastic lens substrate 10 and the first primer layer 11, the interface between the first primer layer 11 and the second primer layer 12, and the interface between the second primer layer 12 and the hard coat layer 13 can be prevented.

Further, the plastic lens 1 produced in any of Examples 8 to 11 had favorable impact resistance. The reason is presumably that the plastic lens 1 produced in any of Examples 8 to 11 had the second primer layer 12, and the second primer layer 12 could absorb impact. Further, the plastic lens 1 produced in any of Examples 8 to 11 also had favorable adhesion.

The optical article according to the invention can be preferably used as a plastic lens. Examples of the plastic lens include optical lenses such as lenses for spectacles, lenses for cameras, lenses for telescopes, lenses for microscopes and collective lenses for steppers.

The entire disclosure of Japanese Patent Application Nos: 2007-267774, filed Oct. 15, 2007 and 2008-016342, filed Jan. 28, 2008 and 2008-208121, filed Aug. 12, 2008 are expressly incorporated by reference herein.

What is claimed is:

1. An optical article comprising a plastic substrate, wherein a primer layer and a hard coat layer are formed on a surface of the plastic substrate, and the primer layer is formed from a coating composition containing the following components (A) to (C):
    (A) a polyurethane resin;
    (B) metal oxide fine particles; and
    (C) an organosilicon compound,
    wherein the average particle diameters of the component (A) and the component (B) in the coating composition are from 5 to 50 nm, respectively, and the average particle diameter of the component (C) is 5 nm or less.

2. The optical article according to claim 1, wherein the plastic substrate is obtained by polymerizing and curing a polymerizable composition containing an episulfide compound as a main component and has a refractive index of 1.7 or higher.

3. The optical article according to claim 1, wherein the component (C) is an organosilicon compound having an epoxy group.

4. The optical article according to claim 1, wherein the component (B) is metal oxide fine particles containing titanium oxide having a rutile-type crystal structure as a main component.

5. The optical article according to claim 1, wherein the optical article is a plastic lens.

6. The optical article according to claim 1, wherein the optical article has
    a first layer which is in contact with the plastic substrate and has a refractive index which decreases in the direction away from the plastic substrate;
    a second layer which is in contact with the first layer and has a refractive index not higher than that of a surface layer of the first layer; and
    a hard coat layer which is in contact with the second layer and has a refractive index lower than that of the plastic substrate.

7. The optical article according to claim 6, wherein the second layer is formed from a second material containing a urethane, ester, epoxy, acrylic or silicone organic resin and metal oxide fine particles.

8. The optical article according to claim 6, wherein a first material for forming the first layer, the second material for forming the second layer, and a third material for forming the hard coat layer each contain metal oxide fine particles and an organic resin, and the ratio of the metal oxide fine particles to the organic resin contained in the first material is greater than the ratio of the metal oxide fine particles to the organic resin contained in the second material.

9. The optical article according to claim 8, wherein the ratio of the metal oxide fine particles to the organic resin contained in the third material is greater than the ratio of the metal oxide fine particles to the organic resin contained in the second material.

10. An optical article comprising a plastic substrate, wherein a primer layer and a hard coat layer are formed on a surface of the plastic substrate, and the primer layer is formed from a coating composition containing the following components (A) to (C):
    (A) a polyurethane resin;
    (B) metal oxide fine particles; and
    (C) an organosilicon compound,
    wherein the refractive index of the primer layer decreases continuously or stepwise from the side of the plastic substrate toward the side of the hard coat layer.

11. An optical article comprising a plastic substrate, wherein a primer layer and a hard coat layer are formed on a surface of the plastic substrate, and the primer layer is formed from a coating composition containing the following components (A) to (C):
    (A) a polyurethane resin;
    (B) metal oxide fine particles; and
    (C) an organosilicon compound,
    wherein the component (C) is an organoalkoxysilane compound and the organoalkoxysilane compound is used in the form of an unhydrolyzed monomer.

* * * * *